US011054660B2

(12) United States Patent
Urzhumov

(10) Patent No.: US 11,054,660 B2
(45) Date of Patent: Jul. 6, 2021

(54) METHODS AND APPARATA FOR DIRECTION-SELECTIVE FILTERING AND APPLICATIONS THEREOF

(71) Applicant: Elwha, LLC, Bellevue, WA (US)

(72) Inventor: Yaroslav A. Urzhumov, Bellevue, WA (US)

(73) Assignee: Imagia LLC, Bellevue, WA (US)

( * ) Notice: Subject to any disclaimer, the term of this patent is extended or adjusted under 35 U.S.C. 154(b) by 277 days.

(21) Appl. No.: 16/173,895

(22) Filed: Oct. 29, 2018

(65) Prior Publication Data

US 2020/0133015 A1 Apr. 30, 2020

(51) Int. Cl.
*G02B 27/09* (2006.01)
*G02B 6/32* (2006.01)
(Continued)

(52) U.S. Cl.
CPC ............ *G02B 27/0961* (2013.01); *G02B 1/11* (2013.01); *G02B 6/32* (2013.01); *G02B 27/0012* (2013.01); *G02B 30/25* (2020.01)

(58) Field of Classification Search
CPC ............ G02B 26/0816; G02B 26/0833; G02B 27/286; G02B 27/0018; G02B 30/56; G02B 5/124; G02B 1/11; G02B 27/0012; G02B 27/0101; G02B 27/0172; G02B 27/0961; G02B 27/46; G02B 30/25; G02B 3/0068; G02B 3/0087; G02B 5/1828; G02B 6/32; G03F 7/0007; G03F 7/70116;
(Continued)

(56) References Cited

U.S. PATENT DOCUMENTS

| 5,132,839 A | 7/1992 | Travis |
| 2009/0109518 A1 | 4/2009 | Atkin |
| 2012/0312969 A1* | 12/2012 | Leonhardt .............. G02B 27/58 250/216 |

FOREIGN PATENT DOCUMENTS

JP 2005182073 A 7/2005

OTHER PUBLICATIONS

Schurig, "An Aberration-Free Lens with Zero F-Number," New Journal of Physics, Nov. 27, 2008, 11, vol. 10, IOP Publishing Ltd and Deutsche Physikalische Gesellschaft, www.njp.org.
(Continued)

*Primary Examiner* — Brandi N Thomas
(74) *Attorney, Agent, or Firm* — Phillips Winchester; Justin K. Flanagan

(57) ABSTRACT

A multi-layer optical device may include one, two, or three layers. A first layer may include an array of Fourier-transforming optically transmissive elements to map optical radiation between each of a plurality of angles of incidence and corresponding coordinate locations proximate each respective optically transmissive element. A second layer may provide a modulation matrix of optically modulating sub-elements optically coupled to the array of transmissive elements, where each optically modulating sub-element corresponds to one of the coordinate locations of the first layer mapping. A third layer includes an array of inverse Fourier-transforming optically transmissive elements to inverse-map optical radiation from the optically modulating sub-elements of the modulation matrix for propagation at angles corresponding to the angles of incidence from which the optical radiation was received.

23 Claims, 25 Drawing Sheets

(51) Int. Cl.
  *G02B 1/11*   (2015.01)
  *G02B 27/00*  (2006.01)
  *G02B 30/25*  (2020.01)
(58) Field of Classification Search
  CPC ............ G03F 7/70191; G03F 7/70566; G03F
       7/70308; H01S 3/1305; H01S 5/02325;
       H01S 5/0261; H01S 5/0687; H01S
       5/1007; H01S 5/12; H01S 5/142; H01S
       5/227; H01S 5/3434; H01S 5/50; G02F
       1/13306; G02F 1/133345; G02F
       1/133512; G02F 1/133514; G02F
       1/133526; G02F 1/133536; G02F
       1/133553; G02F 1/133562; G02F
       1/133565; G02F 1/13362; G02F 1/1337;
       G02F 1/133738; G02F 1/134363; G02F
       1/13439; G02F 1/13471; G02F 1/136286;
       G02F 1/1368; G02F 1/29; G02F 2203/01;
       G02F 2203/07; G02F 2203/09; G02F
       1/133371; G02F 1/292; G02F 2201/305;
       G02F 2203/22; G02F 1/01716; G02F
       1/3515; G02F 1/3551; G02F 2/004; G11B
       7/0065; G11B 7/0901; G11B 7/0908;
       G11B 7/128; G11B 7/1362
  See application file for complete search history.

(56) References Cited

OTHER PUBLICATIONS

Landy, et al., "Approaches to Three-Dimensional Transformation Optical Media Using Quasi-Conformal Coordinate Transformations," arXiv:1007.4363 v1 [physics.optics], Jul. 26, 2010, www.arxiv.org/abs/1007.4363.

Shin, et al., "Broadband Electromagnetic Cloaking with Smart Metamaterials," Nature Communications, Nov. 20, 2012, 3.1213, DOI: 10.1038/ncomms2219, Macmillan Publishers Ltd., www.nature.com/naturecommunications.

Hunt, et al., "Broadband Wide Angle Lens Implemented with Dielectric Metamaterials," Sensors, Aug. 12, 2011, vol. 11, p. 7982-7991; DOI: 10.3390/s110807982, MDPI, Basel, Switzerland, www.mdpi.com/journal/sensors.

Schurig, et al., "Calculation of Material Properties and Ray Tracing in Transformation Media," Optics Express, Oct. 16, 2006, vol. 14, No. 21, p. 9794-9804, Optical Society of America, www.osapublishing.org.

Paul, et al., "Construction of Invisibility Cloaks of Arbitrary Shape and Size Using Planar Layers of Metamaterials," AIP: Journal of Applied Physics, Jun. 20, 2012, vol. 111, 9 pp, 123106; DOI: 10.1063/1.4729012, American Institute of Physics, dx.doi.org/10.1063/1.4729012.

Urzhumov, et al., "Cross-Section Comparisons of Cloaks Designed by Transformation Optical and Optical Conformal Mapping Approaches," Journal of Optics, Nov. 16, 2010, vol. 13, 12 pp, 024002; DOI: 10.1088/2040-8978/13/2/024002, IOP Publishing Ltd., stacks.iop.org/12/024002.

Rahm, et al., "Design of Adaptive Optics by Finite Embedded Coordinate Transformations," 2008, psu.edu.

Rahm, et al., "Design of Electromagnetic Cloaks and Concentrators Using Form-Invariant Coordinate Transformations of Maxwell's Equations," Photonics and Nanostructures—Fundamentals and Applications, Aug. 8, 2007, vol. 6, p. 87-95, DOI.1016/j.photonics.2007.07.013, Elsevier B. V., elsevier.com/locate/photonics.

Popa, et al., "Design of Layered Transformation-Optics Devices of Arbitrary Shape," Physical Review A, Sep. 30, 2010, vol. 82, 5 pp, 033837, DOI: 10.1103/PhysRevA.82.033837, The American Physical Society, journals.aps.org/pra/abstract/10.1103/PhysRevA.82.033837.

Kundtz, et al., "Electromagnetic Design with Transformation Optics," Proceedings of the IEEE, Oct. 2011, vol. 99, No. 10, p. 1622-1633, DOI: 10.1109/JPROC.2010.2089664, IEEE.

Smith, et al., "Enhancing Imaging Systems Using Transformation Optics," Optics Express, Sep. 22, 2010, vol. 18, No. 20, p. 21238-21251, Optical Society of America, www.osapublishing.org.

Kundtz, et al., "Extreme-Angle Broadband Metamaterial Lens," Nature Materials, Feb. 2010, vol. 9, p. 129-132, Macmillan Publishers Ltd., www.nature/com/naturematerials.

Urzhumov, et al., "Low-Loss Directional Cloaks Without Superluminal Velocity or Magnetic Response," Optics Letters, Nov. 1, 2012, vol. 37, No. 21, p. 4471-4473, Optical Society of America, www.osapublishing.org.

Cummer, et al., "Material Parameters and Vector Scaling in Transformation Acoustics," New Journal of Physics, Nov. 27, 2008, vol. 10, 12 pp, IOP Publishing Ltd. and Deutsche Physikalische Gesellschaft, www.njp.org.

Rahm, et al., "Optical Design of Reflectionless Complex Media by Finite Embedded Coordinate Transformations," arXiv:0711.1846 v.2 [physics.optics], Dec. 4, 2007, www.arxiv.org/abs/0711.1846.

Roberts, et al., "Optical Lens Compression Via Transformation Optics," Optics Express, Sep. 14, 2009, vol. 17, No. 19, p. 16535-16542, Optical Society of America, www.osapublishing.org.

Hunt, et al., "Perfect Relay Lens at Microwave Frequencies Based on Flattening a Maxwell Lens," Journal of the Optical Society of America B, Aug. 2011, vol. 28, No. 8, p. 2025-2028, Optical Society of America, www.osapublishing.org.

Chen, et al., "Special Issue on Transformation Optics," Journal of Optics, 2016, 040201, 3 pp, DOI:10.1088/2040-8978/18/4/040201, IOP Publishing Ltd.

Werner, et al., "Transformation Electromagnetics and Metamaterials—Fundamental Principles and Applications," 2014, 499 pp, Springer-Verlag, London.

Hunt, et al., "Transformation Optics Compressed Rotman Lens Implemented with Complementary Metamaterials," Proceedings of the Society of Photo-Optical Instrumentation Engineers (SPIE), 2010, vol. 8021, 7 pp, DOI:10.1117/12.884319, Radar Sensor Technology XV, www.spiedigitallibrary.org.

Urzhumov, et al., "Transformation Optics with Photonic Band Gap Media," Phys. Rev. Lett. 105, 163901, arXiv:1007.3227 [physics.optics], Jul. 19, 2010, 4 pp, www.arxiv.org/abs/1007.3227.

Schurig, et al., "Transformation-Designed Optical Elements," Optics Express, Oct. 29, 2007, vol. 15, No. 22, 11 pp, Optical Society of America, www.osapublishing.org.

Shin, et al., "A Versatile Smart Transformation Optics Device with Auxetic Elasto-Electromagnetic Metamaterials," Scientific Reports, Feb. 13, 2014, 4:4084, DOI: 10.1038/srep04084, www.nature.com/scientificreports.

PCT International Search Report; International App. No. PCT/US2019/058332, dated Feb. 21, 2020; 5 pages.

* cited by examiner

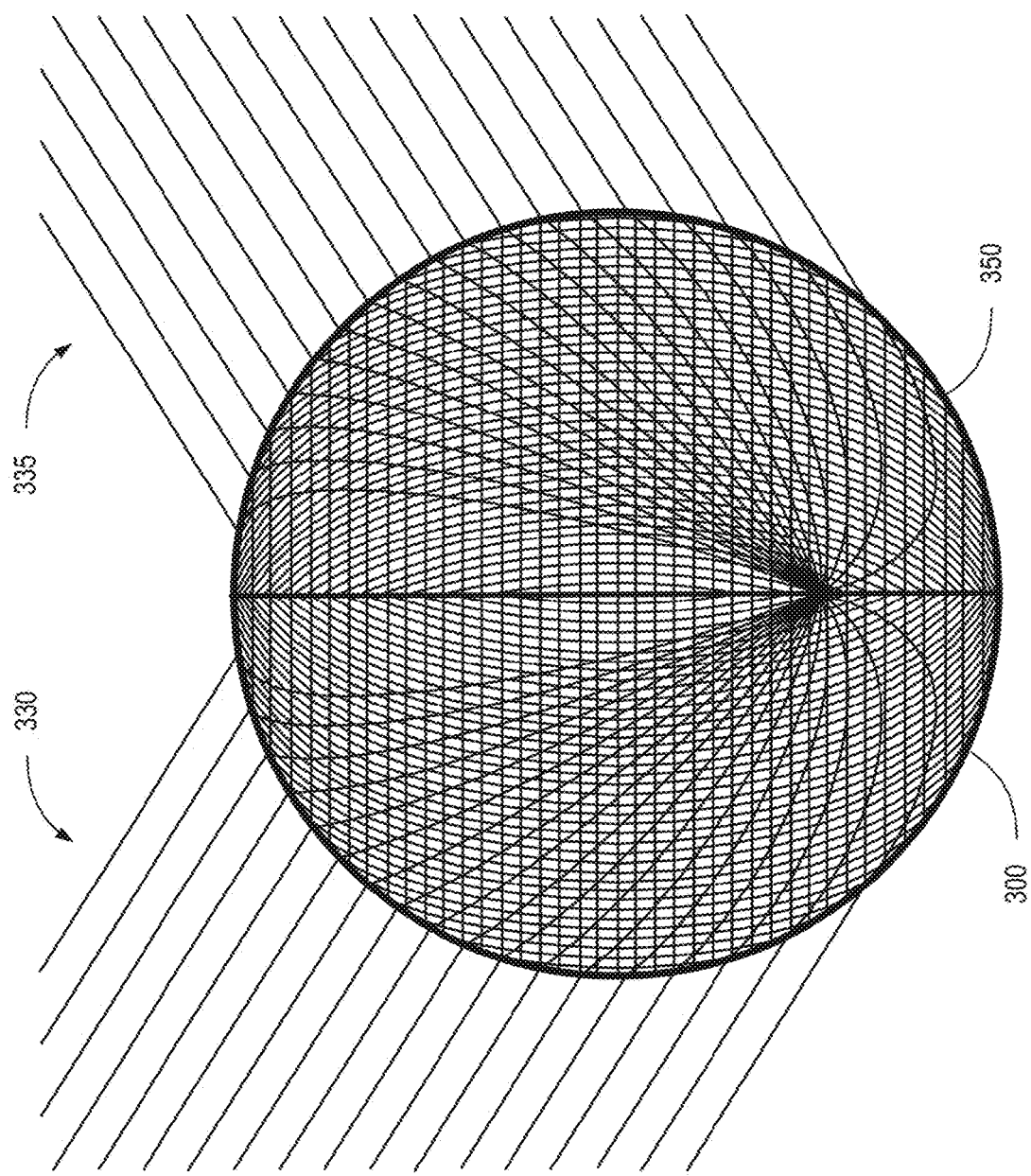

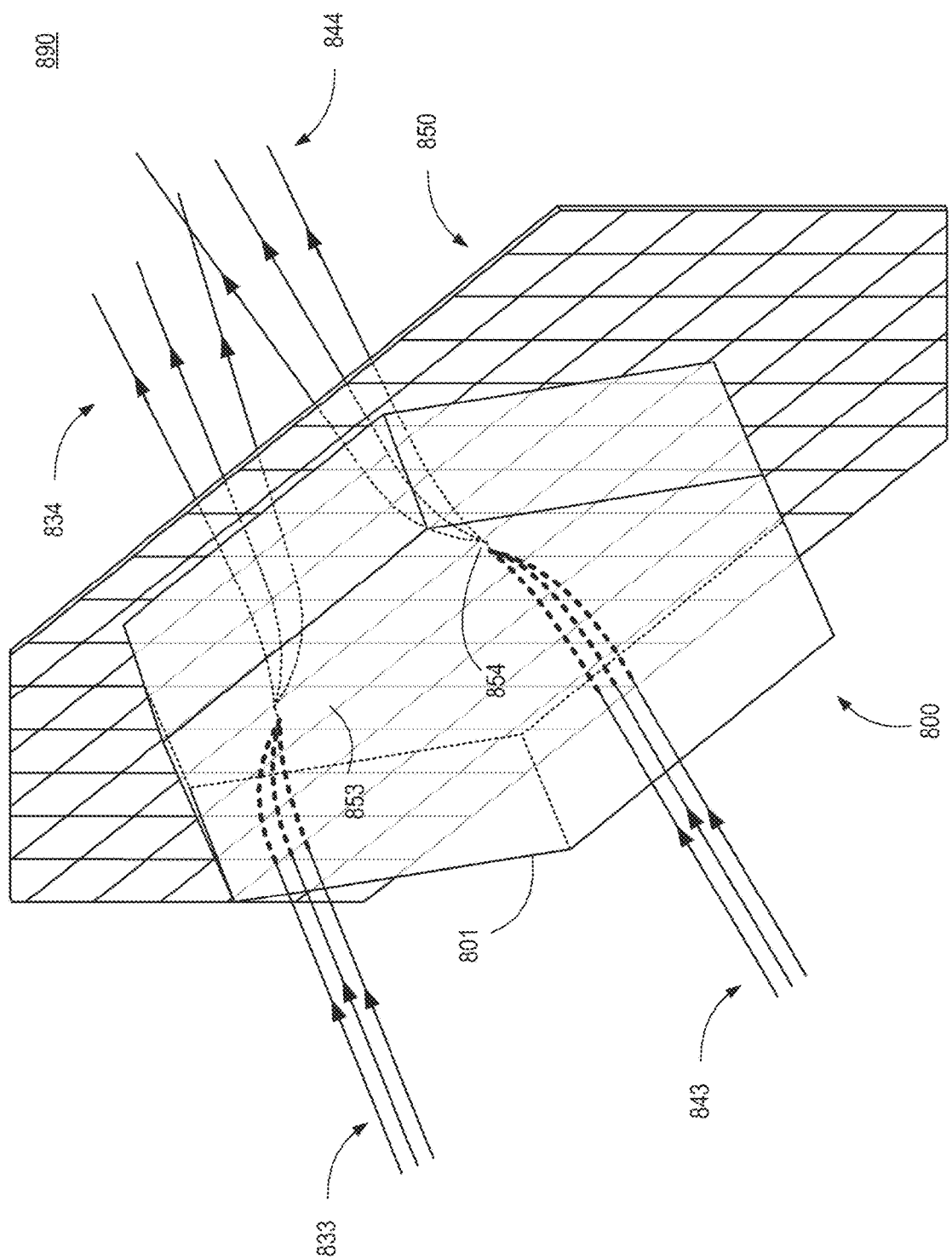

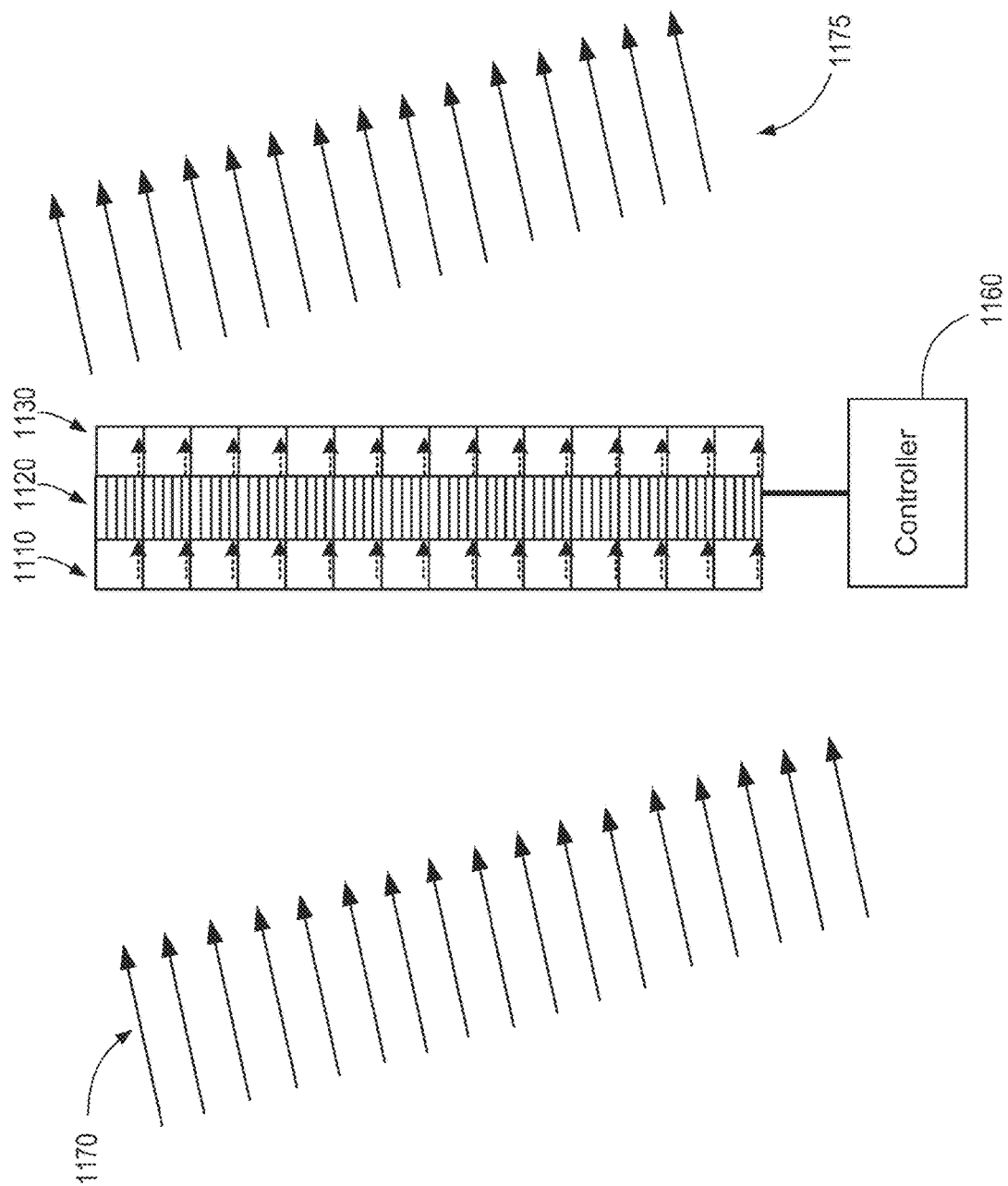

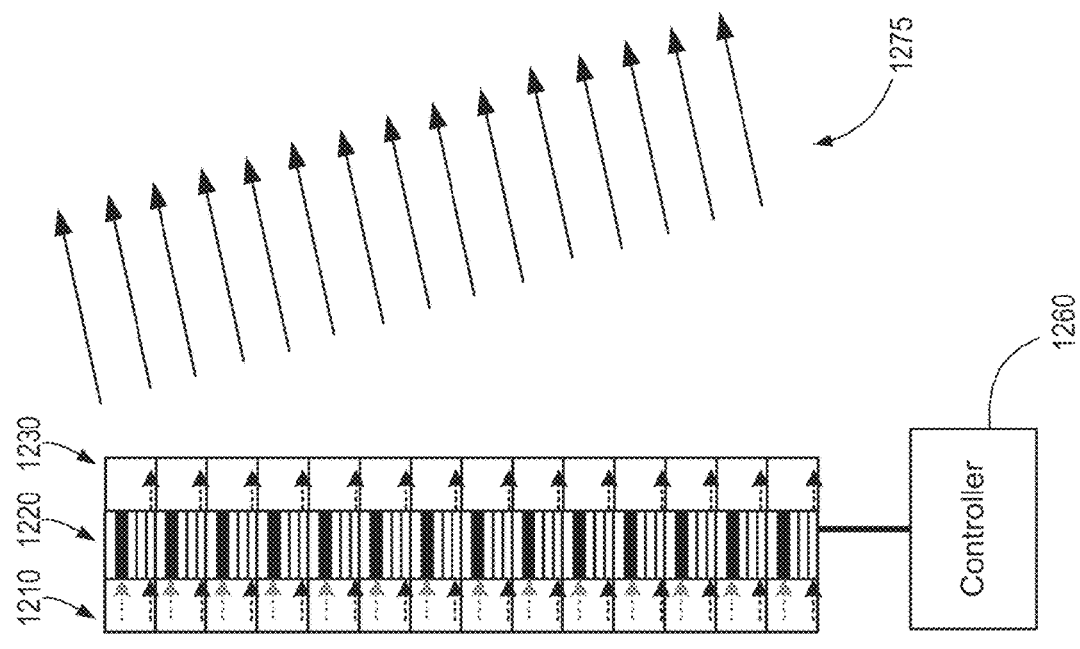
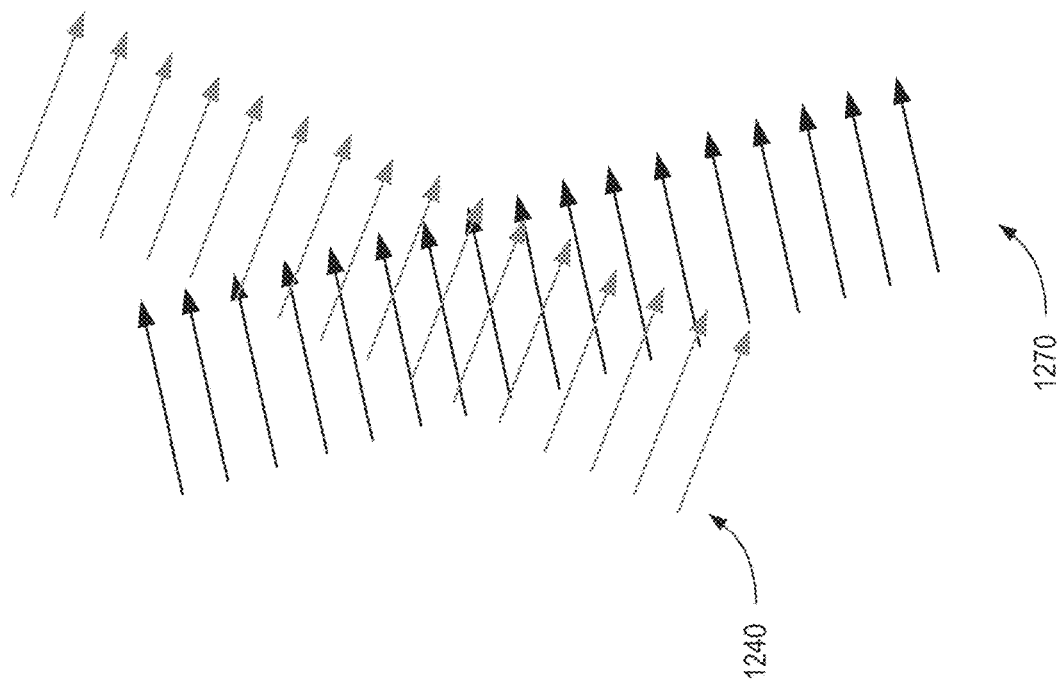
FIG. 12

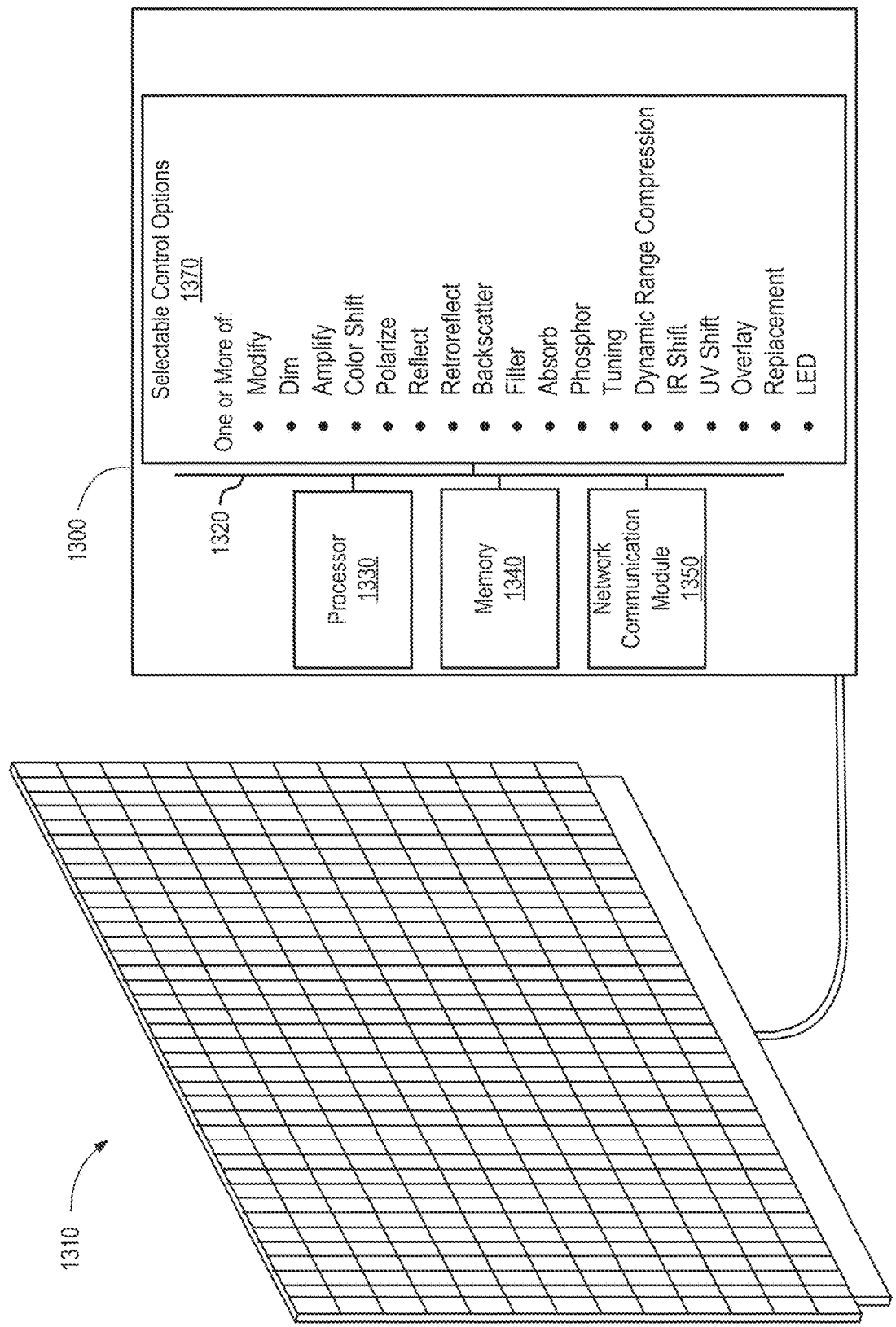

METHODS AND APPARATA FOR DIRECTION-SELECTIVE FILTERING AND APPLICATIONS THEREOF

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc., applications of such applications are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119(e) for provisional patent applications, for any and all parent, grandparent, great-grandparent, etc., applications of the Priority Application(s)). In addition, the present application is related to the "Related Applications," if any, listed below.
Priority Applications:
  NONE
Related Applications:
If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

TECHNICAL FIELD

This disclosure relates to refractive structures with direction-selective filtering. For example, an array of Fourier-transforming optically transmissive elements can map optical radiation at various angles of incidence and to corresponding coordinate locations.

BRIEF DESCRIPTION OF THE DRAWINGS

FIG. 3 illustrates optical radiation ray paths for optical radiation refracted through two flattened Luneburg lenses, according to one embodiment.

FIG. 8E illustrates optical radiation passing through a modulation matrix and diverging.

FIG. 11B illustrates the block diagram of the three-layer optical apparatus with optical radiation received from a different direction.

FIG. 12 illustrates the controller implementing direction-selective filtering by blocking optical radiation from one angle, according to one embodiment.

FIG. 13 illustrates a block diagram of a computing system for implementing one or more available direction-selective optical radiation modifications via a two-dimensional array of sub-elements of a modulation matrix associated with a single transmissive element, according to one embodiment.

DETAILED DESCRIPTION

Figure 1:
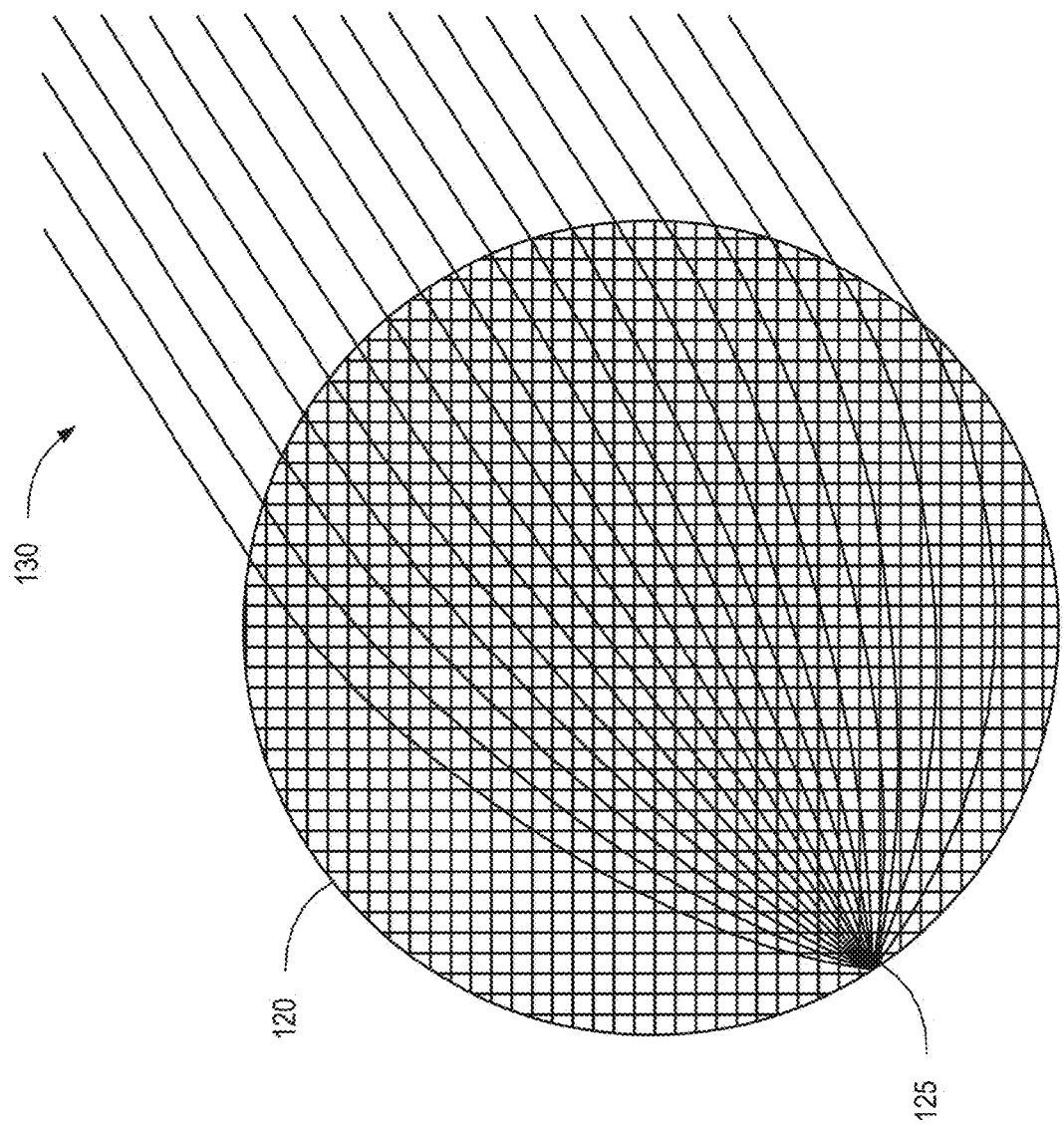
FIG. 1 illustrates an optical radiation ray path from a first direction mapped by a Luneburg lens to a coordinate location on the opposite side, according to one embodiment.

According to various embodiments, systems, apparatuses, and methods are described herein that relate to mapping optical radiation between specific coordinate locations and angle of incidence. For example, an optical apparatus may comprise one, two or three basic layers. Some embodiment may utilize a single layer, according to combinations of one or more of the embodiments described herein. Other embodiments may utilize two layers or three layers, according to combinations of one or more of the embodiments described herein.

First Optically Transmissive Layer:

A first layer may comprise a plurality of optically transmissive elements forming an array to receive, transmit, or transmit and receive optical radiation. Each of the optically transmissive elements may be a Fourier-transforming optically transmissive element to map optical radiation between each of a plurality of angles of incidence and corresponding coordinate locations. The Fourier-transforming optically transmissive elements are referred to herein as simply "transmissive elements" for short and may have the characteristics and/or properties of a combination of one or more of the embodiments described herein. In some embodiments, a support material may maintain the structural integrity or otherwise maintain the optically transmissive elements in an array.

Each of the transmissive elements in the array may have a relatively narrow field of view (e.g., 15-45 degrees), a moderate field of view (e.g., 45-90 degrees), moderately wide field of view (e.g., 90-135 degrees) or a wide field of view (e.g., 135-180 degrees). The specific field or fields of view in a given plane or direction may depend on the application, a target thickness/thinness of the array, cost, material selections, and other practical considerations or design choices. In some embodiments, each transmissive element in the array has a field of view with a solid angle between approximately $\pi$ and $2\pi$ steradian.

Each of the Fourier-transforming optically transmissive elements may be arranged in a substantially planar array with a fill factor exceeding a highest possible fill factor of uniform diameter circles within a rectangular region. For example, the array of Fourier-transforming optically transmissive elements may have a relative fill factor exceeding approximately 80%, or even exceeding 90% of the optical apparatus in its entirety including, for example, the support material. The efficiency of the optical apparatus may depend, in part on the transmittance of the array of Fourier-transforming optically transmissive elements. Maximizing the fill factor for a given shape and planar array shape (e.g., a flat, curved, or conformal planar array) and/or maximizing the individual transmittance of each transmissive element may increase the efficiency of the optical apparatus. In various embodiments, the transmittance of each transmissive element in the array may have a transmittance greater than 80%. The transmittance of the overall radiation efficiency, including its non-transmissive structural elements may exceed 70%.

As a receiver or in a receive mode, each transmissive element may comprise a diffractive lens with a distribution of dielectric constants to effectuate the mapping of the optical radiation received at each of the plurality of angles of incidence to each respective coordinate location. As a transmitter or in a transmit mode, each transmissive element may comprise a diffractive lens with a distribution of dielectric constants to effectuate the mapping of optical radiation to each of the plurality of angles of incidence based on the coordinate location from which the optical radiation originated. In various embodiments, a transmissive element or an array of transmissive elements may selectively operate in receive or transmit modes. In other embodiments, a transmissive element or an array of transmissive elements may operate simultaneously or be time-modulated in both transmit and receive modes.

Each transmissive element of the array may comprise a refractive lens with a distribution of dielectric constants to effectuate the mapping of the optical radiation between each of the plurality of angles of incidence and each respective coordinate location. Each transmissive element may comprise a gradient refractive index lens (GRIN lens). In some embodiments, each transmissive element in an array is modeled as or physically comprises a plurality of voxels (three-dimensional volumes in a three-dimensional space akin to two-dimensional pixels in a two-dimensional space) with discrete dielectric constants approximating a continuous distribution of dielectric constants of a continuous-gradient refractive index lens (GRIN).

Each of the transmissive elements of the array may map a visible band of optical radiation received at each of the plurality of angles of incidence to each respective coordinate location. The mapping may be made regardless of frequency, or as a function of frequency. For example, green light at a given angle of incidence may be mapped to one coordinate location, while red light at the same angle of incidence may be mapped to a different location. The array may function to map optical radiation for a continuous band or one or more plurality of narrow bands. For example, in display or imaging embodiments, the transmissive elements may be configured to map specific bands of red, green and blue (or magenta cyan, and yellow). The mapping of narrow bands to coordinate locations based on the angle of incidence (or to angles of propagation based on originating coordinate location) may be independent of frequency and/or a function of frequency, as previously described.

In various embodiments, a plurality of narrow bands may be selected to allow for the reproduction of a gamut of colors when combined (e.g., red, a green, and a blue). Each transmissive element in the array may operate to perform a Fourier transform of optical radiation properties from transverse wavenumbers to transverse coordinate locations adjacent to said transmissive elements. In some embodiments, at least one of a plurality of voxels of at least one of the transmissive elements in the array may be a metamaterial with a target refractive index for an operational bandwidth. An optical apparatus may be configured to operate in one or more bandwidths, such as bands including one or more of infrared light, visible light, and ultraviolet light.

In various embodiments, each of the transmissive elements in the array is round. In other embodiments, the transmissive elements may be non-round (e.g., rectangular, oval, hexagonal, or the like). Especially in high-fill factor arrays, non-round elements may be utilized. For example, hexagonal transmissive elements may be used with a fill factor approaching one hundred percent.

The optical apparatus may include an array of transmissive elements forming any of a wide variety of shapes, curves, sizes, etc., regardless of the shape of the individual transmissive elements. For instance, the optical apparatus may include a first layer of transmissive elements in an array to form a rounded-shaped optical apparatus, a hexagonal-shaped optical apparatus, rectangular-shaped optical apparatus, a portion of a windshield, or another shape to perform a different function.

The optical apparatus may be sandwiched between interior and exterior layers of optically transparent materials. For instance, the optical apparatus may be embedded within layers of a windshield or, alternatively, form the windshield of a vehicle, aircraft, boat, recreational vehicle, or spacecraft.

In various embodiments, the transmissive elements of the first layer may have a largest dimension (e.g., the diameter of the surface of optical radiation incidence) that is approximately 1 millimeter. In other embodiments, larger diameters of approximately 1 centimeter may be utilized. In still other embodiments, such as those visualized at larger distances, the largest dimension may be approximately 10 centimeters. Thus, a range of dimensions between approximately 1 millimeter up to 100 millimeters may be utilized depending on the application and desired resolution.

The transmissive elements in the array may comprise Maxwell-Luneburg lenses, or modified or reshaped versions thereof. For example, the transmissive elements may comprise a transformation optics-transformed Maxwell-Luneburg lens. As a more specific example, the transformation optics-transformed Maxwell-Luneburg lens may be formed by a quasi-conformal transformation of a Maxwell-Luneburg lens or a flattened Maxwell-Luneburg lens with at least one flattened surface.

In embodiments utilizing flattened Maxwell-Luneburg lenses, the transmissive elements may comprise flattened Maxwell-Luneburg lenses that are flattened on two opposing surfaces such that each flattened Maxwell-Luneburg lens comprises a disk-shaped lens. Each disk-shaped lens may be a cylinder, a rectangular prism, or a hexagonal disk with flat opposing surfaces for incident optical radiation. Each disk-shaped lens comprises a circular disk with flat opposing surfaces.

Each transmissive element in the array may map the optical radiation received at each of a plurality of angles of incidence to a corresponding coordinate location as a focal spot on a plane (e.g., a flat plane or a curved planar surface). In various embodiments, at least some of the transmissive elements may include silica glass, aerogel, porous silica, anti-reflective coatings, or other optically transparent layers.

Optical Modulation Layer:

The optical apparatus may include a modulation matrix of optically modulating sub-elements that are optically coupled to the array of transmissive elements, where each of the transmissive elements in the array may be configured and/or function according to any of the various embodiments described herein. Each of the transmissive elements in the array may map optical radiation between each of the transmissive elements at each of the plurality of angles of incidence to one of the optically modulating sub-elements of the modulation matrix.

The optical apparatus, including at least the first layer of transmissive elements and a modulation matrix layer of optically modulating sub-elements, may operate to receive optical radiation at the first layer and map the optical radiation to specific sub-elements of the modulation matrix based on the angle of incidence. The optical apparatus may operate to propagate or transmit optical radiation through the first layer at a transmission angle of incidence from the transmissive elements based on from which of the plurality of sub-elements optical radiation originated.

In some embodiments, the optical apparatus may further include an immersion medium as an interface between the modulation matrix and the array of transmissive elements. Examples of suitable immersion mediums include, but are not limited to, an oil, a glycerin, and a trapped gas.

The optically modulating sub-elements may include active optically modulating sub-elements to generate an image for transmission through the transmissive elements. The image may be part of a set of three-dimensional images at different locations relative to the transmissive elements for autostereoscopic visualization.

As described above, a transmissive element together with a modulation matrix of optically modulating sub-elements function as a multi-layer direction-selective refractive element. Each multi-layer direction selective refractive element may operate as a varifocal lens responsive to a focus input control. A controller is configured to vary the focal length of at least some of the varifocal lenses via the focus input control to allow for a viewer to accommodate to a focal depth approximately equal to a vergence distance for a stereoscopically viewed image.

The two-layer optical apparatuses described herein may be configured as part of glasses, a visor, or a headset to be worn by a user. A focus input control may allow a viewer or operator to accommodate a focal depth to a target distance. The focus input control may be electrically, mechanically, or acoustically controlled. For instance, the focus input control may be an electrical bias, a mechanical bias, an applied mechanical pressure, a thermal input, an applied acoustic pressure, or other pressure bias.

In some embodiments, the focus input control of an optical apparatus configured to function as a varifocal lens may include an acoustic input that can compress or elongate elements to change their focal lengths. The focus input control may instead be a mechanical pressure stimulus to compress and change refractive indices of one or more of the multi-layer direction-selective refractive elements. In still other embodiments, the optical apparatus may include a compressive transmissive layer of aerogel, a mems actuator, or a capacitive actuator. The multi-layer direction-selective refractive elements may be tunable via mechanical deformation. In some embodiments, mechanical deformation of the entire array of multi-layer direction-selective refractive elements may translate to a known tuning state of each of the multi-layer direction-selective refractive elements. In other embodiments, one or more of the multi-layer direction-selective refractive elements may include a tunable metamaterial.

The optical apparatus may be configured to provide images that are part of a video stream for presenting a virtual reality via, for example, glasses, a visor, a headset, or the like. The modulation matrix may include a first subset of optically modulating sub-elements to generate an image for transmission through the transmissive elements, and a second subset of optically modulating sub-elements to modify optical radiation received from the transmissive elements for image capture.

In some embodiments, multiple optical apparatuses may be used together to form an optical cloaking device. For instance, first and second optical apparatuses may function as a limited bandwidth cloaking device, with each optical apparatus being aligned coplanar to one other on opposite sides of an object to be cloaked and connected via an analog or digital signal transmission line, such that they can each display an image received by the paired device and transmitted via the transmission line. An optical cloaking device in this context is a particular kind of an optical illusion device, which in turn is a kind of an augmented reality system.

In some embodiments, a modulation matrix of optically modulating sub-elements may include an image sensor to capture images based on the optical radiation transmitted through the optically modulating sub-elements. At least one control input in communication with the modulation matrix of optically modulating sub-elements may be used to selectively modify transmission of optical radiation from at least one of the unique locations on the surface of the first layer to the image sensor. The array of optically transmissive elements may autostereoscopically map optical radiation to an image sensor. The optical apparatus may include optically modulating sub-elements that are selectively controllable to modify images captured by the image sensor from the optically transmissive elements.

Another application of the embodiments described herein relate to defensive structures to protect users from optical attacks. A defensive structure may selectively modify the transmittance of the optically modulating sub-elements to retroreflect optical radiation from at least one target angle of incidence. For instance, the optical apparatus may selectively prevent the transmittance of optical radiation through the optically modulating sub-elements at the coordinate locations mapped to by each of the transmissive elements of the array at the at least one target angle of incidence. The defensive structure may selectively modify a transmittance of the optically modulating sub-elements to retroreflect optical radiation. The defensive structure may retroreflect optical radiation from at least one target angle of incidence by selectively reducing the transmittance of optical radiation through the optically modulating sub-elements at the coordinate locations mapped to by each of the transmissive elements of the array.

The number of transmissive elements in an optical apparatus and the number of optically modulating sub-elements may depend on the particular application and desired resolution. Each transmissive element of the array of transmissive elements may be, for example, associated with between 100 and 10,000 optically modulating sub-elements. At least some of the optically modulating sub-elements of the modulation matrix may be controllable to selectively modify a transmittance, reflectance, optical extinction, optical absorption, filtering functionality, polarization, backscattering or retroreflection of the optical radiation incident on the optically modulating sub-elements.

The optical apparatus may form a retroreflective beam that is focused back at the source of an incident beam. Optically modulating sub-elements may be adjustable via one or more control inputs to change a filtering functionality, bandwidth(s) of filtering, polarization state (e.g., adjustments to linear or circular polarization).

In still other embodiments, some of the optically modulating sub-elements of the modulation matrix are controllable to shift the frequency of the optical radiation and/or amplify the optical radiation transmitted therethrough. For example, the modulation matrix may be configured to amplify optical radiation received at certain angles of incidence corresponding to optical radiation from a first spatial region. The optical radiation received by a second subset of optically modulating sub-elements may operate to dim optical radiation received at angles of incidence corresponding to a second spatial region.

In a specific embodiment, the optical apparatus is part of a windshield with a first subset of optically modulating sub-elements of the modulation matrix are at coordinate locations of transmissive elements corresponding to angles of incidence in a frontal spatial region. That is, optical radiation received at angles of incidence corresponding to a region directly in front of the windshield. Modulating sub-elements of a second subset of optically modulating sub-elements are at coordinate locations of transmissive elements corresponding to angles of incidence in periphery spatial regions. Accordingly, the optical radiation received at angles of incidence from, for example, oncoming headlights in a different lane could be automatically dimmed based on the angle from which the optical radiation originates.

In some embodiments, the modulation matrix of the optical apparatus may operate to increase or decrease the total dynamic range of received optical radiation. In some embodiments, the modulation matrix of the optical apparatus may comprise frequency-converting elements, such as phosphor-based elements to up-convert or down-convert the frequency of optical radiation.

In some embodiments, the optical apparatus may further include an optical inversion layer (e.g., as part of the first layer of transmissive elements or as a separate layer). In some embodiments, the modulation matrix may operate to overlay an image or text on the optical radiation transmitted therethrough or therefrom. The optical apparatus may function as a heads-up display (HUD) for a vehicle, such as a car, boar, or aerial vehicle. The optical apparatus may modify optical radiation by superimposing text and/or images as part of a virtual or augmented reality.

Inverse Fourier-Transforming Layer:

The optical apparatus may include a first layer of optically transmissive elements to Fourier-transform received optical radiation for mapping to a modulation matrix of optically modulating sub-elements. According to various embodiments, the optical apparatus may further include an array of inverse Fourier-transforming optically transmissive elements to inverse-map optical radiation between the optically modulating sub-elements of the modulation matrix for propagation at angles corresponding to the angles of incidence from which the optical radiation and the corresponding transmissive elements of the array.

In such an embodiment, optical radiation passes through with imperceptible differences when the modulation matrix is set to allow passthrough without modulation of any type. However, the modulation matrix can be selectively controlled to implement direction-selective modulation in which modulation is applied to the optical radiation based on the direction of travel (e.g., angle of incidence). In some embodiments, an additional inversion layer may be included as a fourth layer and/or functionally incorporated into the Fourier-transforming or inverse Fourier-transforming layer.

The inverse Fourier-transforming optically transmissive elements of the optical apparatus may be embodied as flattened Maxwell fish-eye lenses. In various embodiments, at least one surface of each Maxwell-Luneburg lens is substantially flat. The modulation matrix of optically modulating sub-element may form a planar layer optically coupled to the flattened Maxwell-Luneburg lenses (first layer) and the inverse-Fourier-transforming transmissive elements (second layer), which may be embodied as Maxwell-Luneburg lenses in combination with an inversion layer.

As previously described, each of the flattened Maxwell-Luneburg lenses (first and/or second layer) may be embodied as a quasi-conformal transformation of a Maxwell-Luneburg lens, according to any of the various embodiments described herein. In some embodiments, the optical radiation received at the first layer is Fourier-transformed based on the angle of incidence for mapping to a particular optically modulating sub-element of the modulation matrix associated with a particular transmissive element. The optical radiation can be selectively modified on a direction-selective basis. The inverse Fourier-transforming layer of transmissive elements may propagate the modified (or unmodified) optical radiation in the same direction in which it was received Some embodiments of an optical apparatus may be configured to focus optical radiation. The focus spot of such embodiments may be non-circular due to refractive anomalies in the transmissive elements of the array. In such instances, the inverse Fourier-transforming optically transmissive elements of the array may be configured to correct for the refractive anomalies.

In various embodiments, transmissive elements of a first layer may focus optical radiation to distinct sub-elements of a modulation matrix based on the angle of incidence of the optical radiation. Each of the transmissive elements of the first layer may focus optical radiation received at each angle of incidence to a distinct sub-element of the modulation matrix.

At least some of the inverse Fourier-transforming optically transmissive elements of the array in the third layer may function as varifocal lenses responsive to a focus input control. As in related embodiments providing varifocal lenses, the controller may vary the focal length to allow a viewer to accommodate to a target focal depth.

A three-layer device, including a modulation matrix positioned between an array of Fourier-transforming transmissive elements and an array of inverse Fourier-transforming transmissive elements. Such a device may be configured for use as part of corrective lenses such as eyeglasses or contact lenses, a visor, a headset, or another personal-use device. Some such embodiments may include varifocal capabilities at the first or second layers of Fourier-transforming and inverse Fourier-transforming arrays of transmissive elements. Varifocal input controls may be based on one or more of an electrical bias, a mechanical bias, mechanical deformation, acoustic-based deformations, mems actuators, capacitive actuators, or the like. In some embodiments, the optical apparatus may include a sensor system to detect a location of a user's eye location and automatically adjust the varifocal lens. A sensor system may specifically track vergence of a user's eyes and automatically adjust the varifocal lens.

As previously described, mechanical deformation of the optical apparatus may result in a controlled deformation of each transmissive element in the inverse Fourier-transforming layer. In some embodiments, tunable metamaterials may be utilized to manufacture the Fourier-transforming and/or inverse Fourier-transforming.

Any of the multi-layer embodiments described herein may be used to provide a retroreflective beam focused back at the source of an incident beam. For example, an optical apparatus may be part of an optical defensive system with least some of the optically modulating sub-elements of the modulation matrix controllable to selectively form a retroreflective beam focused back at the source of an incident beam.

Any of the multi-layer embodiments described herein may also be used to generate an overlay on optical radiation from the transmissive elements of the array. Such embodiments may be useful as part of a windshield of a vehicle to provide informational overlays or other visual overlays overlay. Other embodiments may modify the optical radiation to provide for an augmented reality experience on a personal user device, a window, a display, a windshield, a wall, or the like. An overlay may augment images transmitted through the array of transmissive elements to form the augmented reality.

An optical apparatus may include a modulation matrix of optically modulating sub-elements between a layer of Fourier-transforming transmissive elements and a layer of inverse Fourier-transforming transmissive elements. Each transmissive element may be associated with a plurality of sub-elements, depending on the target direction-selectivity. The number and size of the transmissive elements may depend on the target resolution of the optical apparatus. Such an optical apparatus may operate to provide vision-altering effects to a user, such as vision correction of myopia or hypermetropia, vision enhancement, user-selectable zooming capabilities, contrast enhancement, band shifting, light amplification, light reduction, focus shifting, other vision modifications, and/or combinations thereof.

The optical apparatus may additionally or alternatively provide vision protection. The vision protection may include physical vision protection, such as protection from objects impacting the eyes of the user. Vision protection may additionally or alternatively include protection from harmful optical radiation by dimming, frequency shifting, retroflecting, or otherwise preventing harmful optical radiation from damaging the eyes or eye of a user of the optical apparatus.

Such an optical apparatus may be embodied as or as part of corrective lenses such as contact lenses and eyeglasses, goggles, a windshield, a visor, sunglasses, a mask, a helmet, various user-word devices, and the like. The vision-alerting effects may be direction-selective. That is, the effects may be applied to only the optical radiation originating at certain angles of incidence relative to the Fourier-transforming array of transmissive elements.

In some embodiments, the optically modulating sub-elements of the modulation matrix operate to provide band shifting of one or more frequency bands. For example, the modulation matrix may operate to shift non-visible electromagnetic radiation to frequencies within the visible spectrum. Non-visible electromagnetic radiation, such as infrared and/or ultraviolet light may be frequency-converted to frequencies within the visible spectrum. The modulation matrix may enhance the contrast and/or adjust the dynamic range of the optical radiation passed through the optical apparatus to a user.

Each of the transmissive elements, including those in the Fourier transforming layer and the inverse-Fourier transforming layer, may comprise a distribution of dielectric constants to effectuate the mapping between the angle of incidence and coordinate location. The materials used in any of the three layers or sub-layers may be selected for a particular frequency band and/or to function better as a transmitter or a receiver. In various embodiments, the individual lenses may be idealized as graded-permittivity structures having a continuous distribution of dielectric constants, such that there are no abrupt changes in permittivity across the structure. Given the finite bandwidth of typical systems, a discretized piecewise-continuous approximation of the graded-permittivity structure may be electromagnetically equivalent for a given bandwidth.

Thus, in various embodiments, each transmissive element may be divided into a plurality of sub-wavelength voxels. That is, each transmissive element may be conceptually thought of as a plurality of voxels (three-dimensional pixels) whose largest dimension is smaller than a wavelength within the relevant bandwidth (in at least one direction). For example, each voxel may have a maximum dimension in at least one direction that is less than half of a wavelength (e.g., the smallest wavelength) within an operational frequency range. In some embodiments, the voxels may be cubes, parallelepipeds, tetrahedrons, prisms, various regular polyhedrons, or other polyhedrons. In some embodiments, a voxel may have one or two dimensions that are sub-wavelength while the other dimension(s) are larger than a wavelength.

In various embodiments, a combination of voxel shapes and/or sizes may be used. Moreover, voxels may be shaped and/or sized such that little or no space, gaps, or voids exist between voxels. Alternatively, voxels may be arranged such that gaps or voids of various sizes and/or shapes exist intentionally. In some embodiments, the gaps or voids may be ignored and/or negligible in calculating the volumetric dielectric constants. Alternatively, the gaps or voids may be assigned one or more dielectric constants corresponding to a vacuum or to air or another fluid that fills the gaps or voids.

In various embodiments, the transmissive elements may be conceptually discretized to facilitate the use of optimization algorithms, while the physically constructed transmissive elements may not be physically discretized. In other embodiments, the transmissive elements may be physically discretized (e.g., a transmissive element may be printed using a three-dimensional printer). Examples of optimizations and calculations for determining distributions of dielectric constants to accomplish a given design are described in U.S. patent application Ser. No. 14/638,961 filed on Mar. 4, 2015, titled "Holographic Mode Conversion for Electromagnetic Radiation," which application and all applications that claim priority thereto are hereby incorporated by reference in their entireties.

In some embodiments, the distribution of dielectric constants may comprise a distribution of only dielectric materials. The transmissive elements may be manufactured to be porous and/or comprise foam, composite materials, fiber-bundles, stratified layers, micro-rod materials, nano-rod materials, and/or the like. In various embodiments, metamaterials may be utilized. For example, a metamaterial may be utilized that has an effective dielectric constant less than 1 and/or a complex permittivity value or values for an operational frequency range. Multiple different types of metamaterials may be utilized for various dielectric constants less than 1 and/or complex permittivity.

Sub-wavelength voxels may be utilized to attain an effective dielectric constant distribution at specific bandwidths of optical radiation. Examples of suitable materials to construct transmissive elements with target distributions of dielectric constants to map optical radiation between each of a plurality of angles of incidence and corresponding coordinate locations include, but are not limited to: porcelain, glass, plastic, air, nitrogen, sulfur hexafluoride, perylene, mineral oil, ceramic, paper, mica, polyethylene, aluminum oxide, and other optically transmissive and non-optically transmissive materials. In some embodiments, a non-superluminal low-loss dielectric (NSLLD) material may be utilized. Sub-wavelength voxels of non-optically transmissive materials may be utilized, in some embodiments, to attain a target distribution of dielectric constants without significantly reducing the overall transmittance of the optical apparatus.

In some embodiments, the transmissive elements may be manufactured having discretized sub-wavelength voxels of materials having various dielectric constants. For example, an array of transmissive elements, and (optionally) a support material to hold the transmissive elements together, may be printed with a three-dimensional printer. In other embodiments, the discretized sub-wavelength voxels may be manufactured using a wide variety of known techniques, such as etching, chemical deposition, masking, molten extrusion, injection molding, heating, ultrasonication, and/or other fabrication techniques known in the art for the materials utilized in a particular embodiment.

According to any of the various embodiments described herein, or combinations thereof, an optical system may provide direction selectively filtering via a multi-layer refractive element or an array of multi-layer refractive elements. Each multi-layer refractive element may include a Fourier-transforming layer of transmissive elements to map optical radiation to discrete sub-elements of a modulation matrix based on the angle of incidence. Each multi-layer refractive element may also include an inverse Fourier-transforming layer to inverse map the optical radiation, as modified by the modulation matrix, for propagation at predetermined transmit angles of incidence based on the specific sub-element from which the optical radiation originated.

Accordingly, a system may be configured to receive optical radiation on an input surface of a first optically transmissive layer at each of a plurality of angles of incidence and map the optical radiation received at each of the plurality of angles of incidence to one of a plurality of locations on an output surface of the first layer. A modulation matrix, for example, may modify the transmission of optical radiation from the output surface of the first layer to a second optically transmissive layer at one or more of the plurality of unique locations. The second optically transmissive layer may inverse-map optical radiation from each of the plurality of unique locations for propagation at angles corresponding to the received angles of incidence associated with each unique location.

As previously described, an optical apparatus may be specifically configured to function as an autostereoscopic display with multi-layer direction-selective filtering. Such a device may include a layer of selectively activated sub-elements to generate optical radiation at distinct locations. An optically transmissive layer may propagate the optical radiation generated at each distinct location at a distinct, pre-programmed or pre-configured angle of propagation. The device may include at least one control input in communication with the layer to selectively activate the sub-elements to modify the generation of optical radiation at the distinct locations. A controller may be in communication with each of the at least one control inputs to control the selective activation of the sub-elements to provide direction-selective modifications to the optical radiation.

Similarly, an optical apparatus may be configured to function in the opposite direction for capturing autostereoscopic images. That is, a camera for still photos or video capture may utilize a multi-layer direction selective filter to capture images with knowledge of the angle of incidence of received optical radiation to allow for the reconstruction of an autostereoscopic image. For example, a first optically transmissive layer may map optical radiation received at each of a plurality of angles of incidence to one of a plurality of locations on an output surface of the first layer. A modulation matrix of optically modulating sub-elements coupled to the output surface of the first layer may allow for the selective modulation (modification, overlay, dimming, amplifying, etc.). An image sensor may capture an image of the optical radiation transmitted through the optically modulating sub-elements. One or more control inputs may be controlled by a controller to communicate with the modulation matrix to provide a default, user-selected, optimized, or arbitrary modulation of received optical radiation for image and/or video capture.

In still other embodiments, a bi-directional autostereoscopic video communications device may utilize a multi-layer optical apparatus to provide direction-selective filtering for autostereoscopic video display and concurrent video capture. An optically transmissive layer may map optical radiation received on an exposed surface at each of a plurality of angles of incidence to one of a plurality of locations on an opposing surface of the optically transmissive layer. The optically transmissive layer may also map optical radiation from each of the plurality of unique locations on the opposing surface of the optically transmissive layer for propagation at each of a plurality of unique angles of propagations. The optical apparatus may include a modulation matrix of optically modulating sub-elements coupled to the opposing surface of the optically transmissive layer. In various embodiments, at least one layer of imaging elements is optically coupled to the opposing surface of the optically transmissive layer via the modulation matrix of optically modulating sub-elements. The imaging elements may, for example, comprise a plurality of light-producing elements to generate optical radiation for selective transmission through the modulation matrix of optically modulating sub-elements to some of the unique locations on the opposing surface of the optically transmissive layer. The optically modulating sub-elements may further include a plurality of sensor elements to capture an image corresponding to the optical radiation selectively transmitted through the modulation matrix of optically modulating sub-elements from the unique locations on the opposing surface.

Various combinations of the numerous embodiments described herein are possible. For example, an autostereoscopic camera and an autostereoscopic display may be combined as a single unit that can both capture optical radiation from external sources and simultaneously, or substantially simultaneously from a user's perspective, display an autostereoscopic image, sequence of images, and/or video. A controller or control circuitry may control one or more control inputs off the modulation matrix of to selectively modify transmission of optical radiation from at least one of the unique locations on the output surface of the first layer to an image sensor.

Various techniques and approaches, including optimization approaches, manufacturing techniques, approximation approaches, various enhancements, and the like may be utilized as known in the art. Examples of useful teachings that may be employed, further enable, explain, and/or may otherwise be combined with the specific embodiments described herein include the following, each of which is hereby incorporated by reference in its entirety:

SHIN, et al., "Broadband Electromagnetic Cloaking with Smart Metamaterials," Nature Communications, Nov. 20, 2012, 3.1213, DOI: 10.1038/ncomms2219, Macmillan Publishers Ltd., www.nature.com/naturecommunications;

HUNT, et al., "Broadband Wide Angle Lens Implemented with Dielectric Metamaterials," Sensors, Aug. 12, 2011, Vol. 11, p. 7982-7991; DOI 10.3390/s110807982, MDPI, Basel, Switzerland, www.mdpi.com/journal/sensors;

SCHURIG, et al., "Calculation of Material Properties and Ray Tracing in Transformation Media," Optics Express, Oct. 16, 2006, Vol. 14, No. 21, p. 9794-9804, Optical Society of America, www.osapublishing.org;

PAUL, et al., "Construction of Invisibility Cloaks of Arbitrary Shape and Size Using Planar Layers of Metamaterials," AIP: Journal of Applied Physics, Jun. 20, 2012, Vol. 111, 9 pp, 123106; DOI: 10.1063/1.4729012, American Institute of Physics, dx.doi.org/10.1063/1.4729012;

URZHUMOV, et al., "Cross-Section Comparisons of Cloaks Designed by Transformation Optical and Optical Conformal Mapping Approaches," Journal of Optics, Nov. 16, 2010, Vol. 13, 12 pp, 024002; DOI: 10.1088/2040-8978/13/2/024002, 10P Publishing Ltd., stacks.iop.org/12/024002;

RAHM, et al., "Design of Adaptive Optics by Finite Embedded Coordinate Transformations," 2008, psu.edu;

RAHM, et al., "Design of Electromagnetic Cloaks and Concentrators Using Form-Invariant Coordinate Transformations of Maxwell's Equations," Photonics and Nanostructures—Fundamentals and Applications, Aug. 8, 2007, Vol. 6, p. 87-95; DO1.1016/j.photonics.2007.07.013, Elsevier B. V., elsevier.com/locate/photonics;

POPA, et al., "Design of Layered Transformation-Optics Devices of Arbitrary Shape," Physical Review A, Sep. 30, 2010, Vol. 82, 5 pp, 033837, DOI: 10.1103/PhysRevA.82.033837, The American Physical Society, journals. aps. org/pra/abstract/10.1103/PhysRevA.82.033837;

KUNDTZ, et al., "Electromagnetic Design with Transformation Optics," Proceedings of the IEEE, October 2011, Vol. 99, No. 10, p. 1622-1633, DOI: 10.1109/JPROC.2010.2089664, IEEE;

KUNDTZ, et al., "Extreme-Angle Broadband Metamaterial Lens," Nature Materials, February 2010, Vol. 9, p. 129-132, Macmillan Publishers Ltd., www. nature/com/naturematerials;

URZHUMOV, et al., "Low-Loss Directional Cloaks Without Superluminal Velocity or Magnetic Response," OPTICS LETTERS, Nov. 1, 2012, Vol. 37, No. 21, p. 4471-4473, Optical Society of America, www.osapublishing.org;

CUMMER, et al., "Material Parameters and Vector Scaling in Transformation Acoustics," New Journal of Physics, Nov. 27, 2008, Vol. 10, 12 pp, 10P Publishing Ltd. and Deutsche Physikalische Gesellschaft, www.njp.org;

RAHM, et al., "Optical Design of Reflectionless Complex Media by Finite Embedded Coordinate Transformations," arXiv:0711.1846 v.2 [physics.optics], Dec. 4, 2007, www.arxiv.org/abs/0711.1846;

ROBERTS, et al., "Optical Lens Compression Via Transformation Optics," OPTICS EXPRESS, Sep. 14, 2009, Vol. 17, No. 19, p. 16535-16542, Optical Society of America, www.osapublishing.org;

HUNT, et al., "Perfect Relay Lens at Microwave Frequencies Based on Flattening a Maxwell Lens," Journal of the Optical Society of America B, August 2011, Vol. 28, No. 8, p. 2025-2028, Optical Society of America, www.osapublishing.org;

CHEN, et al., "Special Issue on Transformation Optics," Journal of Optics, 2016, 040201, 3 pp, D01:10.1088/2040-8978/18/4/040201, 1OP Publishing Ltd;

Werner, et al., "Transformation Electromagnetics and Metamaterials—Fundamental Principles and Applications," 2014, 499 pp, Springer-Verlag, London;

HUNT, et al., "Transformation Optics Compressed Rotman Lens Implemented with Complementary Metamaterials," Proceedings of the Society of Photo-Optical Instrumentation Engineers (SPIE), 2010, Vol. 8021, 7 pp, D01: 10.1117/12.884319, Radar Sensor Technology XV, www.spiedigitallibrary.org;

URZHUMOV, et al., "Transformation Optics with Photonic Band Gap Media," Phys. Rev. Lett. 105, 163901, arXiv:1007.3227 [physics.optics], Jul. 19, 2010, 4 pp, www.arxiv.org/abs/1007.3227;

SCHURIG, et al., "Transformation-Designed Optical Elements," Optics Express, October 2007, Vol. 15, No. 22, 11 pp, Optical Society of America, www.osapublishing.org; and SHIN, et al., "A Versatile Smart Transformation Optics Device with Auxetic Elasto-Electromagnetic Metamaterials," Scientific Reports, Feb. 13, 2014, 4:4084, DOI: 10.1038/srep04084, www. nature. com/scientificreports.

The generalized descriptions of the systems and methods herein may be utilized and/or adapted for utilization in a wide variety of industrial, commercial, and personal applications. For example, the systems and method described herein may be utilized in communication systems, windshield devices, protection devices, defensive shields, games, electronic toys entertainment devices, and the like. Many of the illustrated embodiments show two-dimensional depictions of three-dimensional arrays to simplify the illustrations.

FIG. 1 illustrates an optical radiation ray path 130 from a first direction mapped by a Luneburg lens 120 to a coordinate location 125 on the opposite side, according to one embodiment. The Luneburg lens 120 may have a distribution of dielectric constants to attain an isotropic medium with a refractive index for a target bandwidth per Equation 1 below:

$$n_L(r) = \sqrt{2 - \frac{r^2}{a^2}} \quad \text{Equation 1}$$

In Equation 1, the index of refraction $n_L$ is a function of the radius r and is unity on the surface of the bounding sphere of radius a and $\sqrt{2}$ at the center. In the theoretically ideal embodiment, the Luneburg lens focuses parallel rays from an infinitely distant source to a single point on the opposite side of the sphere. Close approximations to this theoretically ideal embodiment are often sufficient for various practical applications and relatively narrow bandwidths. Optical radiation incident on the surface of the sphere will be mapped to a unique coordinate location.

If, for example, sensor elements with a finite area larger than a point are placed on one hemisphere of the sphere, each sensor element could be configured to receive optical radiation from a specific angle of incidence (with a range of angles being mapped to the same sensor based on the dimensions of each sensor element).

Similarly, if an array of light emitting diodes (LEDs), or other optical radiation transmitter elements, are positioned on one hemisphere, light emitted by a given LED will be mapped for propagation as parallel rays in a specific angular direction that can be defined relative to an angle of incidence on the surface of the opposing hemisphere where the optical radiation is propagated into, for example, free space. As used herein, the term "angle of incidence" relative to a surface is used to describe the intersection of optical radiation with a surface in either a transmit or receive mode in which optical radiation is being received, transmitted, simultaneously received and transmitted, or time-multiplexed between receiving and transmitting.

Figure 2:
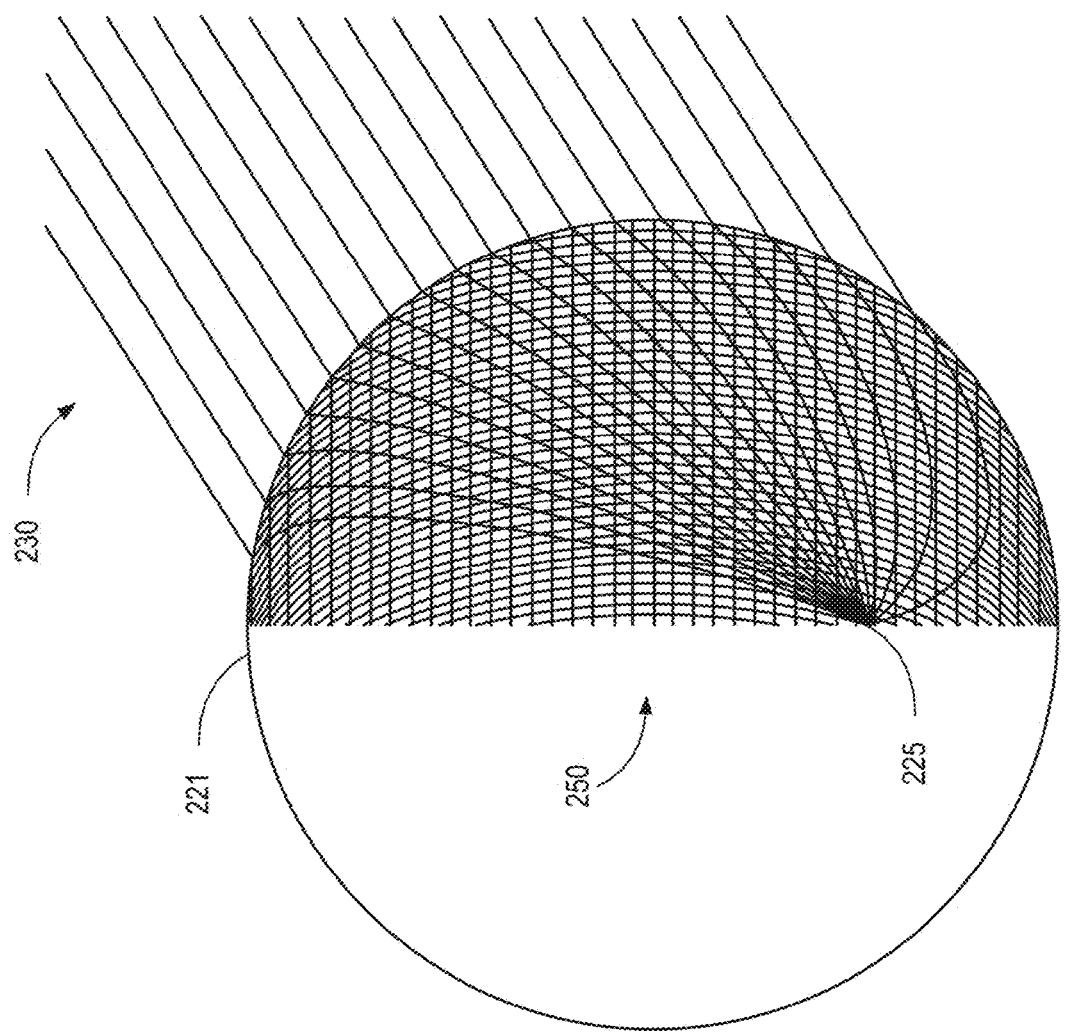
FIG. 2 illustrates the optical radiation ray path from the first direction mapped by a transformed, flattened Luneburg lens for coordinate mapping to a flat image plane, according to one embodiment.

FIG. 2 illustrates the optical radiation ray path 230 from the first direction mapped by a transformed, flattened Luneburg lens 221 for coordinate mapping to a coordinate location 225 on a flat image plane 250, according to one embodiment. The distribution of dielectric constants to attain the refractive indices defined for Luneburg lens 120 of FIG. 1 can be mathematically transformed to map the optical radiation to a different surface inside or outside of the sphere, as described in SCHURIG, "An Aberration-Free Lens with Zero F-Number," New Journal of Physics, Nov. 27, 2008, 11, Vol. 10, 10P Publishing Ltd and Deutsche Physikalische Gesellschaft, www.njp.org, which is hereby incorporated by reference in its entirety.

FIG. 3 illustrates optical radiation ray paths 330 and 335 refracted between two flattened Luneburg lenses 300 and 350, according to one embodiment. The illustrated embodiment further illustrates the functionality of flattened Luneburg lenses and is not necessarily representative of an optical apparatus or device as claimed by this application. Mathematical transformations of optical media in two or three dimensions may be used to generate various functional lenses or combinations thereof that are useful to implement the specific optical apparatuses, devices, and methods described herein.

Examples of such optical transformations using quasi-conformal coordinate transformations can be found in LANDY, et al., "Approaches to Three-Dimensional Transformation Optical Media Using Quasi-Conformal Coordinate Transformations," arXiv:1007.4363 v1 [physics.optics], Jul. 26, 2010, www.arxiv.org/abs/1007.4363, which is hereby incorporated by reference in its entirety.

Figure 4B:
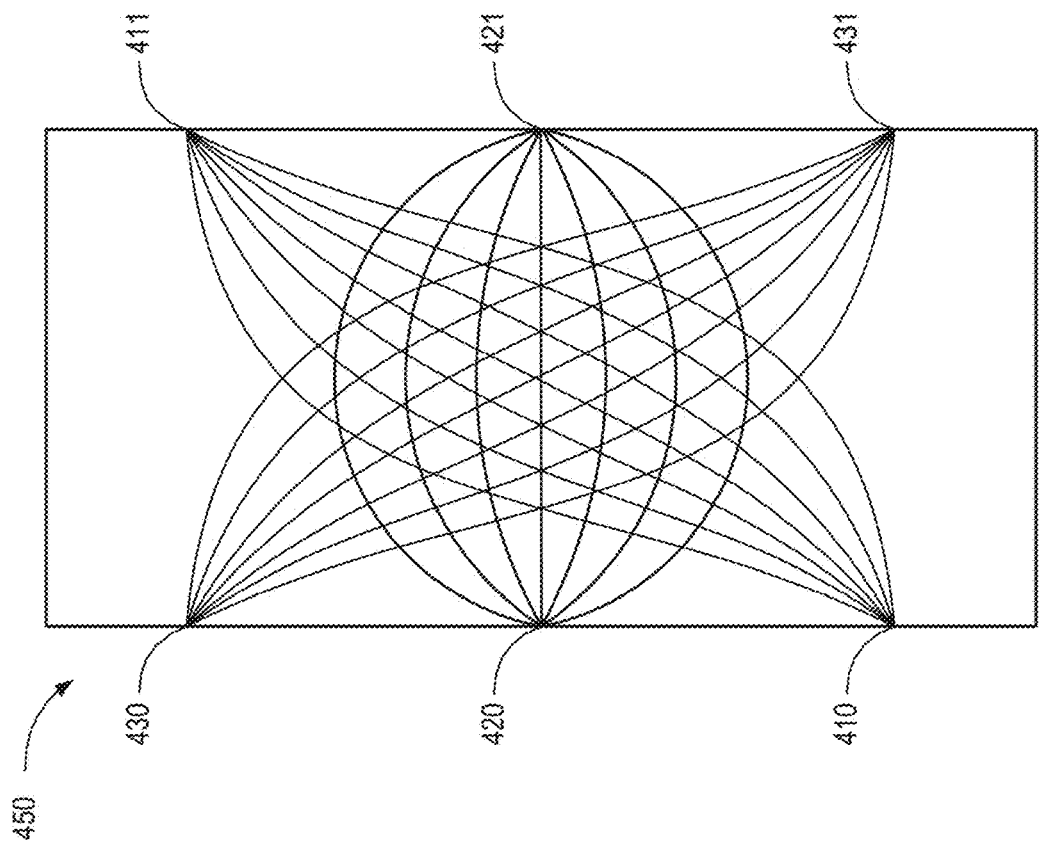
FIG. 4B illustrates a flattened Maxwell fisheye lens based on a volumetric distribution of dielectric constants determined via a mathematical transformation to invert optical radiation, according to one embodiment.
Figure 4A:
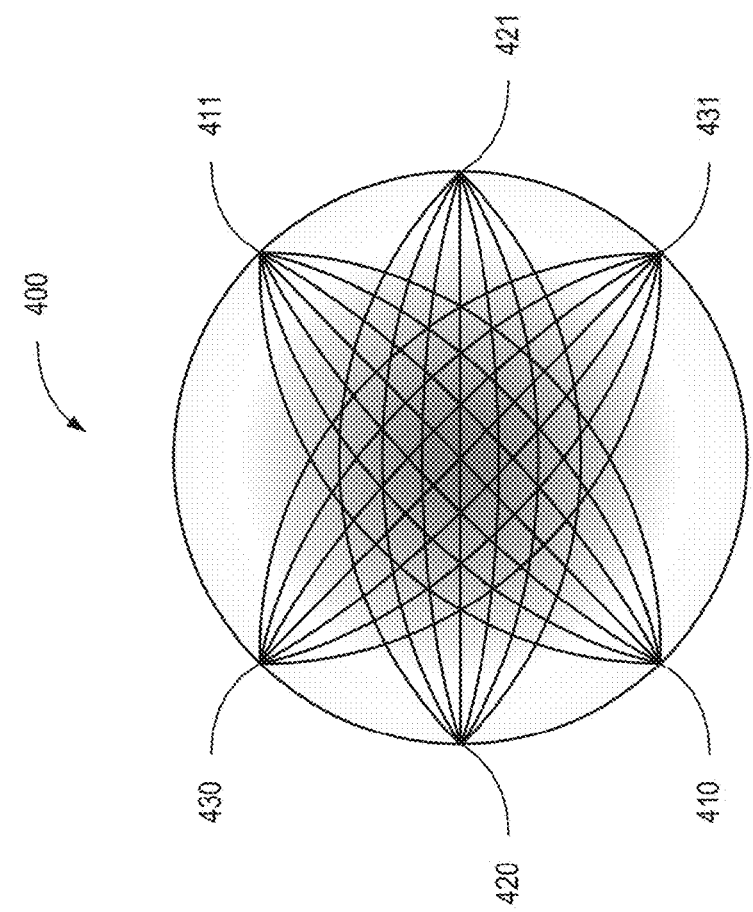
FIG. 4A illustrates a Maxwell fisheye lens connecting aplanatic points between opposing sides of a sphere, according to one embodiment.

FIG. 4A illustrates a Maxwell fisheye lens 400 connecting aplanatic points between opposing sides of a sphere, according to one embodiment. in the illustrated embodiments, optical radiation is refractively mapped between points 410 and 411, 420 and 421, and 430 and 431. A Maxwell fisheye lens 400 can be constructed as a gradient refractive index (GRIN) lens with a radial distribution of refractive indices n(r) that varies according to Equation 2 below:

$$n(r) = 2 - \frac{n_0}{1 + \left(\frac{r}{a}\right)^2} \quad \text{Equation 2}$$

In Equation 2, $n_0$ is the index of refraction for a given bandwidth of optical radiation at the center of the lens, where a is the radius of the lens, and the index of refraction n is a function of the distance r from the center. As described in SMITH, et al., "Enhancing Imaging Systems Using Transformation Optics," Optics Express, Sep. 22, 2010, Vol. 18, No. 20, p. 21238-21251, Optical Society of America, www.osapublishing.org, which is hereby incorporated by reference in its entirety, the Maxwell fisheye lens 400 can be flattened using a coordinate transformation shown in transformation Equation 3 below:

$$x'(x, z) = X\frac{w}{a}; \text{ and } z'(x, z) = \frac{zl}{\sqrt{a^2 - x^2}} \quad \text{Equation 3}$$

Transformation Equation 3 maps a cylindrical region of radius a into a rectangular region of width w and height l.

FIG. 4B illustrates a flattened Maxwell fisheye lens 450, based on the rectangular transformation described above used to identify the volumetric distribution of dielectric constants. The flattened Maxwell fisheye lens 450 operates to invert optical radiation between points 410 and 411, 420 and 421, and 430 and 431, just as lens 400 in FIG. A does, but with flat input and output surfaces, according to one embodiment. in other embodiments, quasi-conformal transformations may be determined to suit a particular application, design specification, material availability, or another target, parameter or limitation. As previously noted, one or more metamaterials may be used in to provide additional design freedoms for operation with specified bandwidths.

Figure 5:
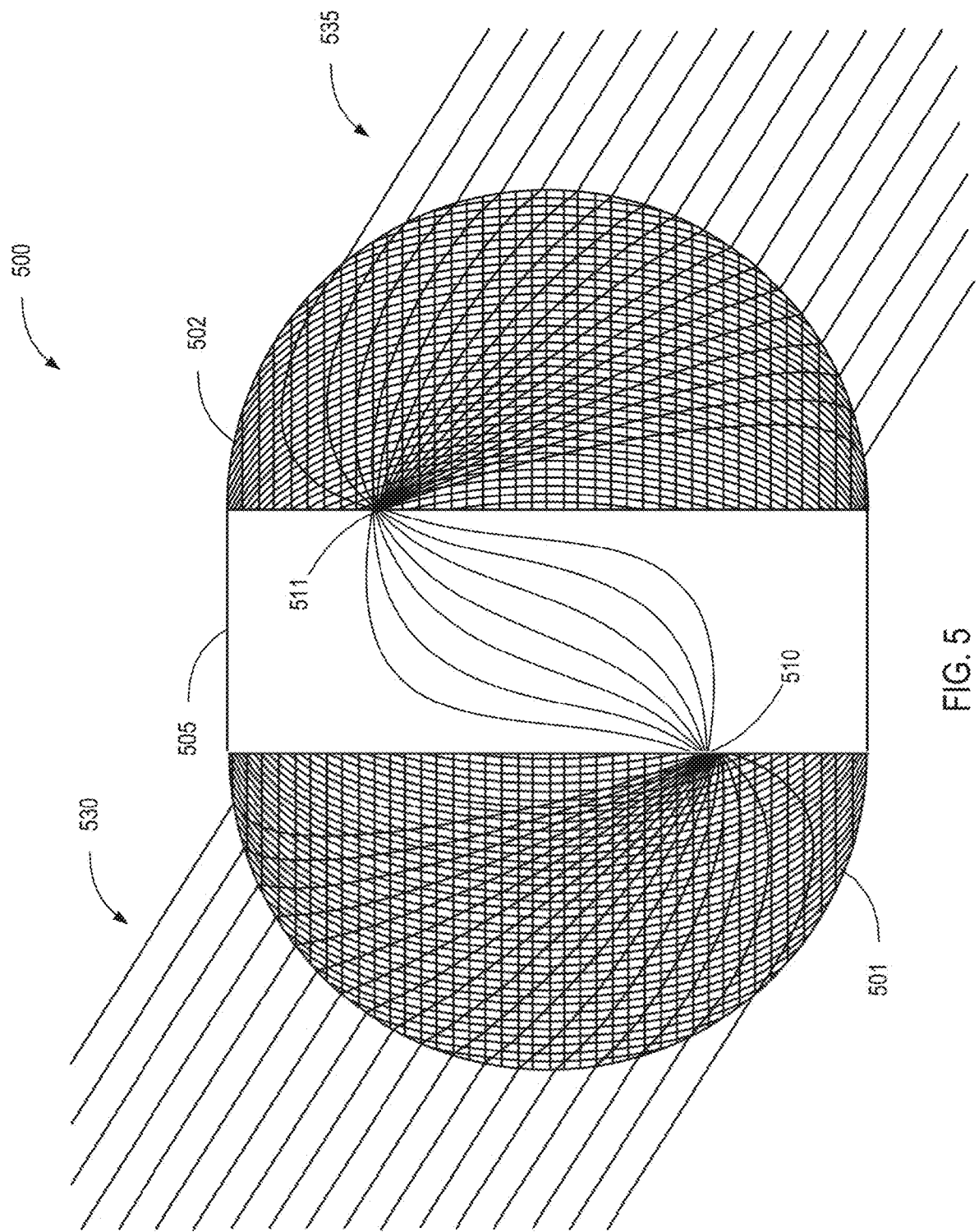
FIG. 5 illustrates a first flattened Luneburg lens, an optical inverting flattened Maxwell fisheye lens, and a second flattened Luneburg lens optically connected in series, according to one embodiment.

FIG. 5 illustrates a flattened Luneburg lens 501, and a second flattened Luneburg lens 502. Positioned therebetween is a flattened Maxwell lens 505. Consistent with the descriptions herein, a Maxwell-Luneburg lens is used to describe a lens that has the functional refractive mapping capabilities of a Luneburg lens and/or a Maxwell lens and may comprise a lens with two distinct lenses or may comprise a single lens configured to perform one or both of the refractive mapping functionalities of Maxwell lens and a Luneburg lens. In various embodiments, the exterior surfaces of the Luneburg lens 501 and/or Luneburg lens 502 may be flattened as well.

As illustrated, the Maxwell-Luneburg lens combination 501, 505, and 502 operates to perform a Fourier-transformation to map optical radiation 530 between angles of incidence on the surface of the lens to a coordinate location 510 on a planar surface. The flattened Maxwell lens portion 505 inverts the optical radiation from the coordinate location 510 to a corresponding "inverted" coordinate location 511. The second inverse Fourier-transforming lens portion 502 maps the optical radiation from the coordinate location 511 for propagation as optical radiation 535 at an angle corresponding to that of the received optical radiation 530.

Figure 6A:
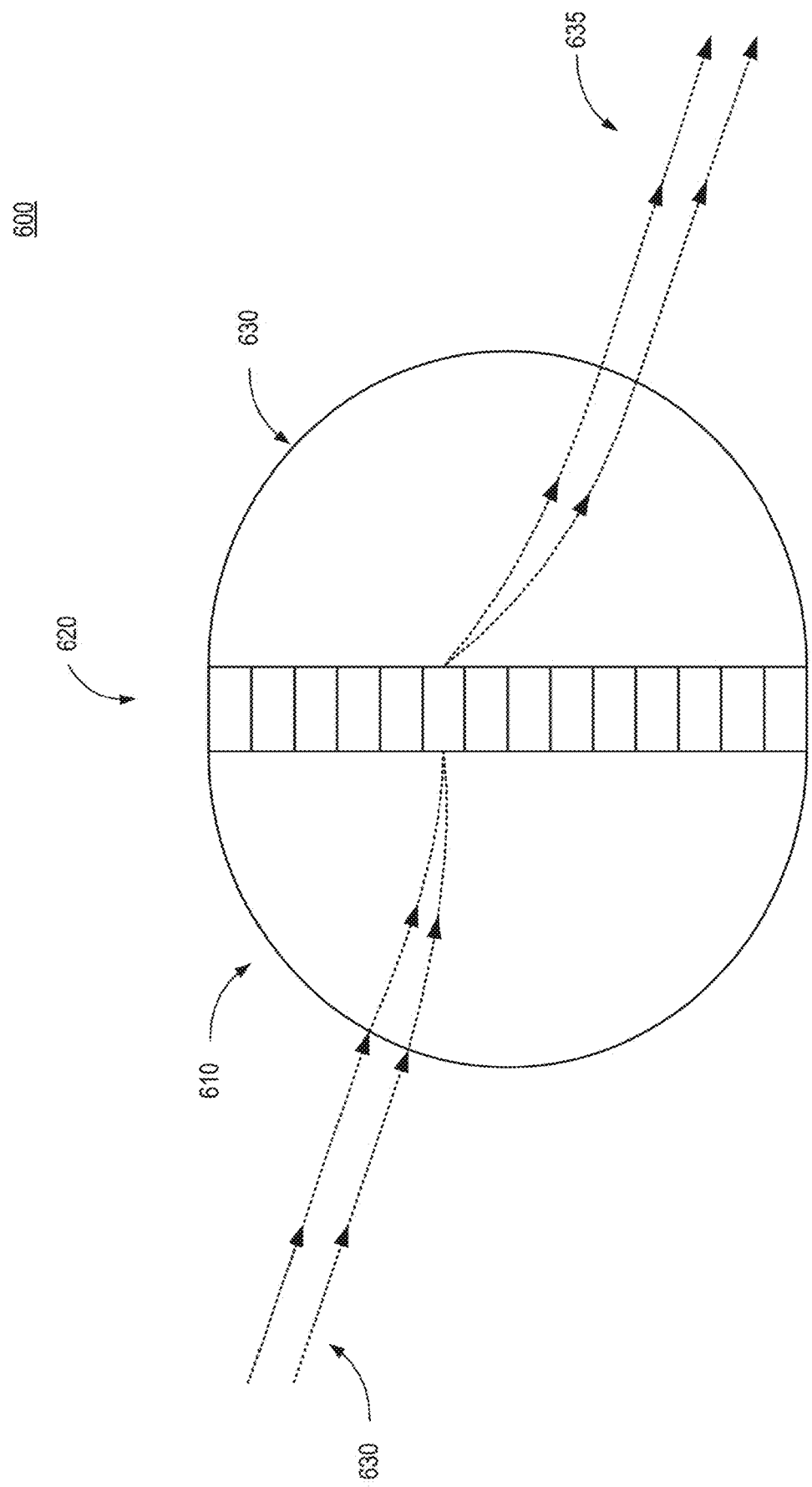
FIG. 6A illustrates a modulation matrix layer between a first Fourier-transforming lens and an inverse Fourier-transforming lens, at least of which further provides optical inversion, according to one embodiment.

FIG. 6A illustrates a modulation matrix layer 620 comprising a plurality of optically modulating sub-elements. A first layer comprises a Fourier-transforming optically transmissive element 610 that maps optical radiation to one of the optically modulating sub-elements of the modulation matrix layer 620 based on the angle of optical radiation 630. The optically modulating sub-elements of the modulation matrix layer 620 can be selectively controlled to manipulate, change, frequency shift, dim, amplify, or otherwise modify optical radiation on a direction-selective basis according to one or more of the examples described herein in this detailed description and/or as listed in the claims. The inverse Fourier-transforming optically transmissive element 630 transforms optical radiation between from each of the optically modulating sub-elements of the modulation matrix layer 620 for propagation as optical radiation 635 at an angle corresponding to the angle of incidence at which the optical radiation 630 was received.

Figure 6B:
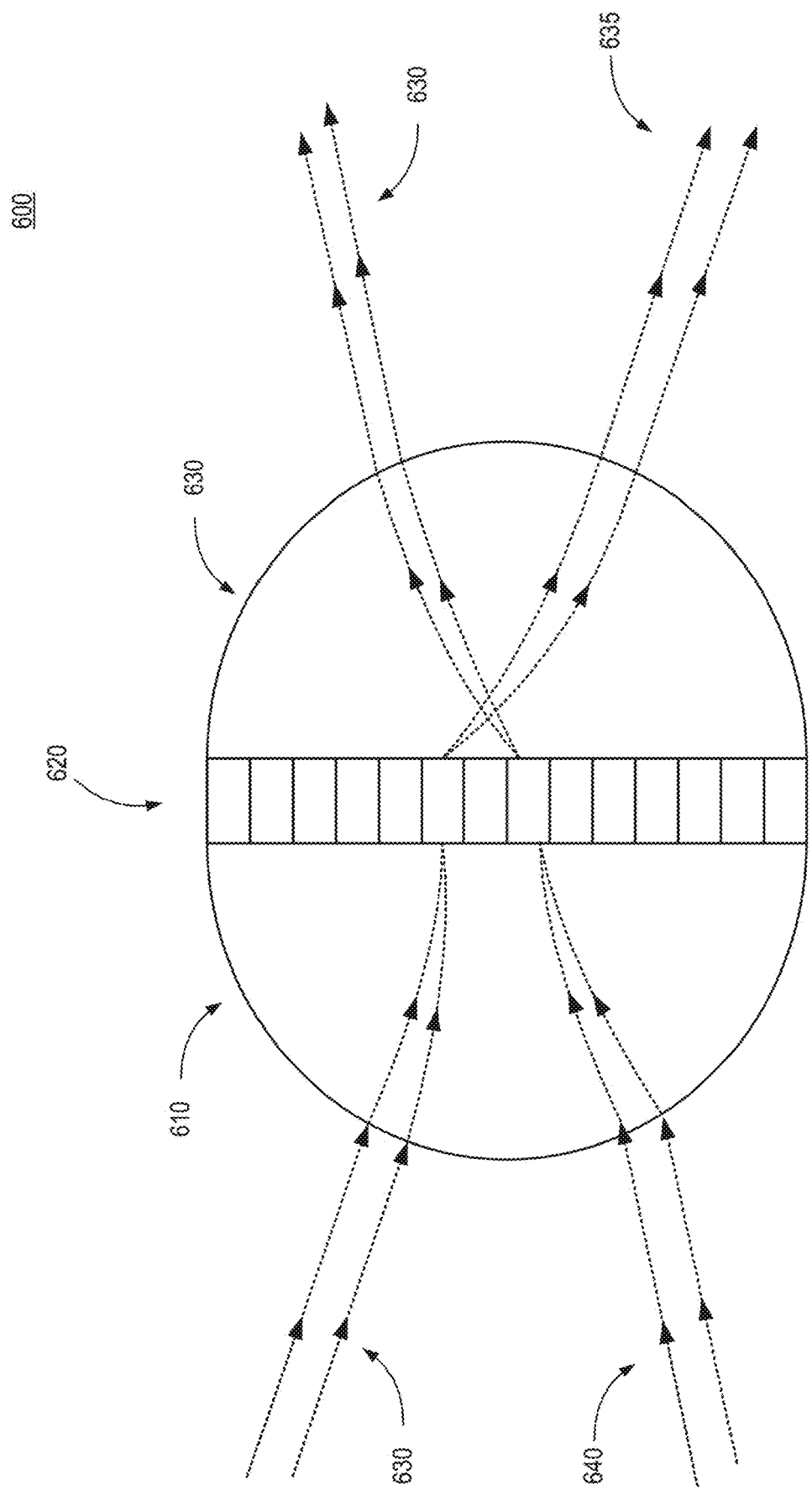
FIG. 6B illustrates the three-layer device of FIG. 6A with an optically transmissive element to perform a Fourier-transformation of optical radiation from two different angles, according to one embodiment.

FIG. 6B illustrates the three-layer device of FIG. 6A with an optically transmissive element 610 to perform a Fourier-transformation of optical radiation 630 and 640 from two different angles for mapping the optical radiation 630 and 640 to different optically modulating sub-elements of the modulation matrix layer 620. The inverse Fourier-transforming transmissive element 630 maps the optical radiation from each of the optically modulating sub-elements for propagation at a distinct angle.

In some embodiments, optical radiation from (or to) a particular angle is mapped to more than one sub-element of the modulation matrix 620. For example, optical radiation at each of a plurality of angles incident on one quadrant of a two-dimensional surface of an optically transmissive element may be mapped to a unique sub-element of the modulation matrix 620. Optical radiation incident on other quadrants (or other partitions) of the two-dimensional surface of the optically transmissive element may be mapped to a different subset of sub-elements of the modulation matrix 620. Thus, for a given number of partitions, optical radiation may be mapped to a corresponding number of sub-elements.

The optically transmissive elements 610 and 630 for Fourier- and inverse Fourier-transformation may comprise Luneburg and/or Maxwell lenses with one or more flattened services (generally referred to as Luneburg-Maxwell lenses with one or more flattened surfaces. The modulation matrix 620 may comprise a plurality of sub-elements that can be individually controlled or controlled in subsets to selectively modify the optical radiation passing therethrough in any of a wide variety of ways, as described herein in detail.

Figure 7:
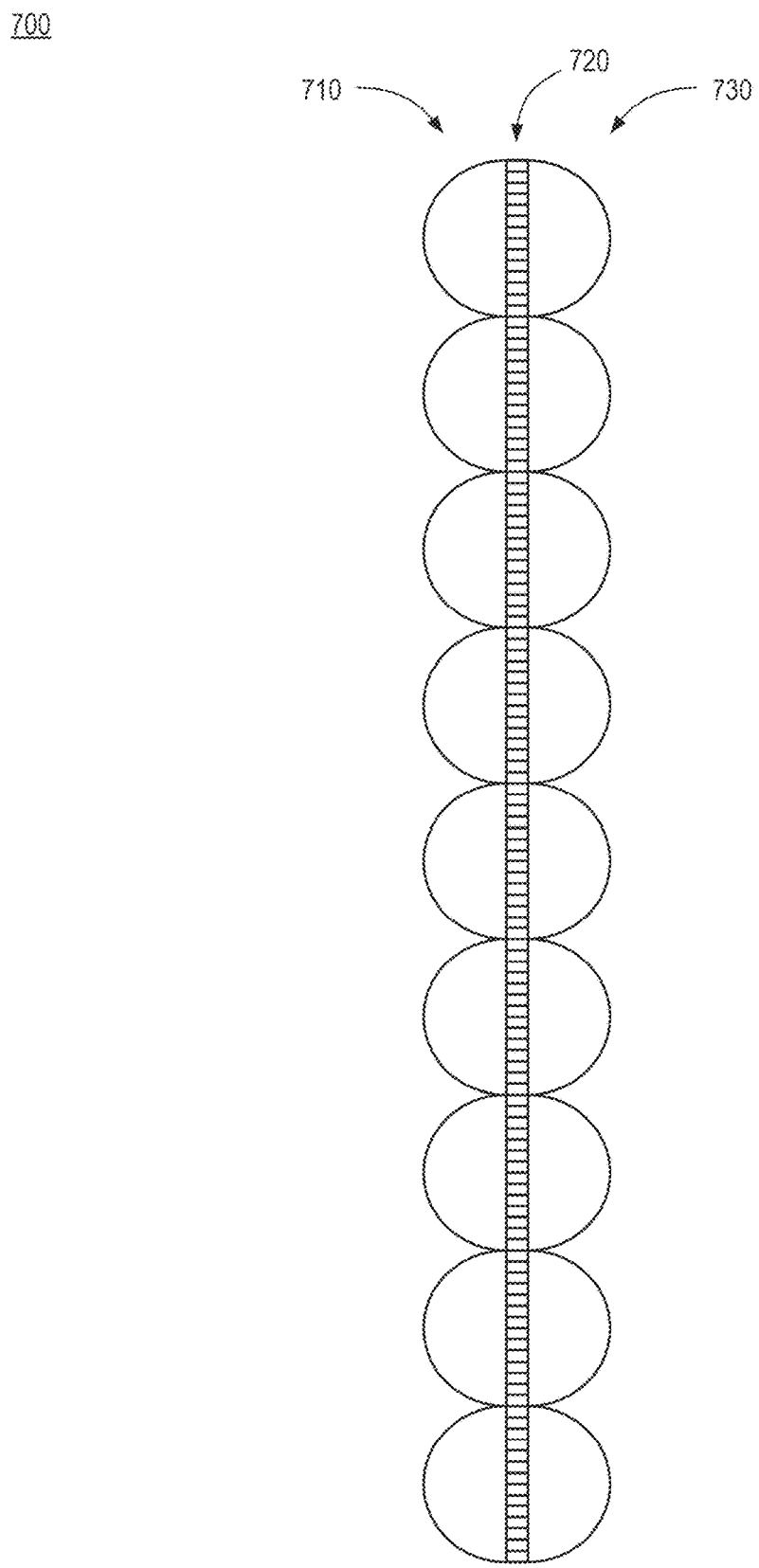
FIG. 7 illustrates an array of Fourier-transforming optically transmissive elements, an optical modulation matrix layer of optically modulating sub-elements, and an array of inverse Fourier-transforming optically transmissive elements, according to one embodiment.

FIG. 7, similar to previously illustrated embodiments, shows a two-dimensional representation of a three-dimensional optical apparatus 700 that include a two-dimensional array of Fourier-transforming optically transmissive elements 710, an optical modulation matrix layer 720, and an array of inverse Fourier-transforming optically transmissive elements 730, according to one embodiment. The optical modulation matrix layer 720 may include any number of optically modulating sub-elements. As previously described, each transmissive element in the array of Fourier-transforming optically transmissive elements and the array of inverse Fourier-transforming optically transmissive elements may have one flattened surface (as illustrated) or flattened input and output surfaces.

Similarly, the length and width dimensions of each transmissive element in the array of Fourier-transforming optically transmissive elements and the array of inverse Fourier-transforming optically transmissive elements may be selected based on a target resolution for a particular application. Likewise, the number of optically modulating sub-elements per optically transmissive element may be selected based on a desired angular selectivity. The number of sub-elements in each dimension of the two-dimensional array associated with opposing Fourier- and inverse Fourier-transforming optically transmissive elements may be selected based on a target angular selectively for direction-selective filtering (i.e., modification to the optical radiation) in each dimension.

For instance, a particular application may configure each of the transmissive elements to have a field of view between 120 and 180 degrees in a horizontal dimension and between 90 and 120 in a vertical dimension. To maintain an angular selectively of 1.5 degrees, the two-dimensional array of optically modulating sub-elements may include between 80 and 120 sub-elements in the horizontal dimension and between 60 and 80 sub-elements in the vertical dimension.

Figure 8A:
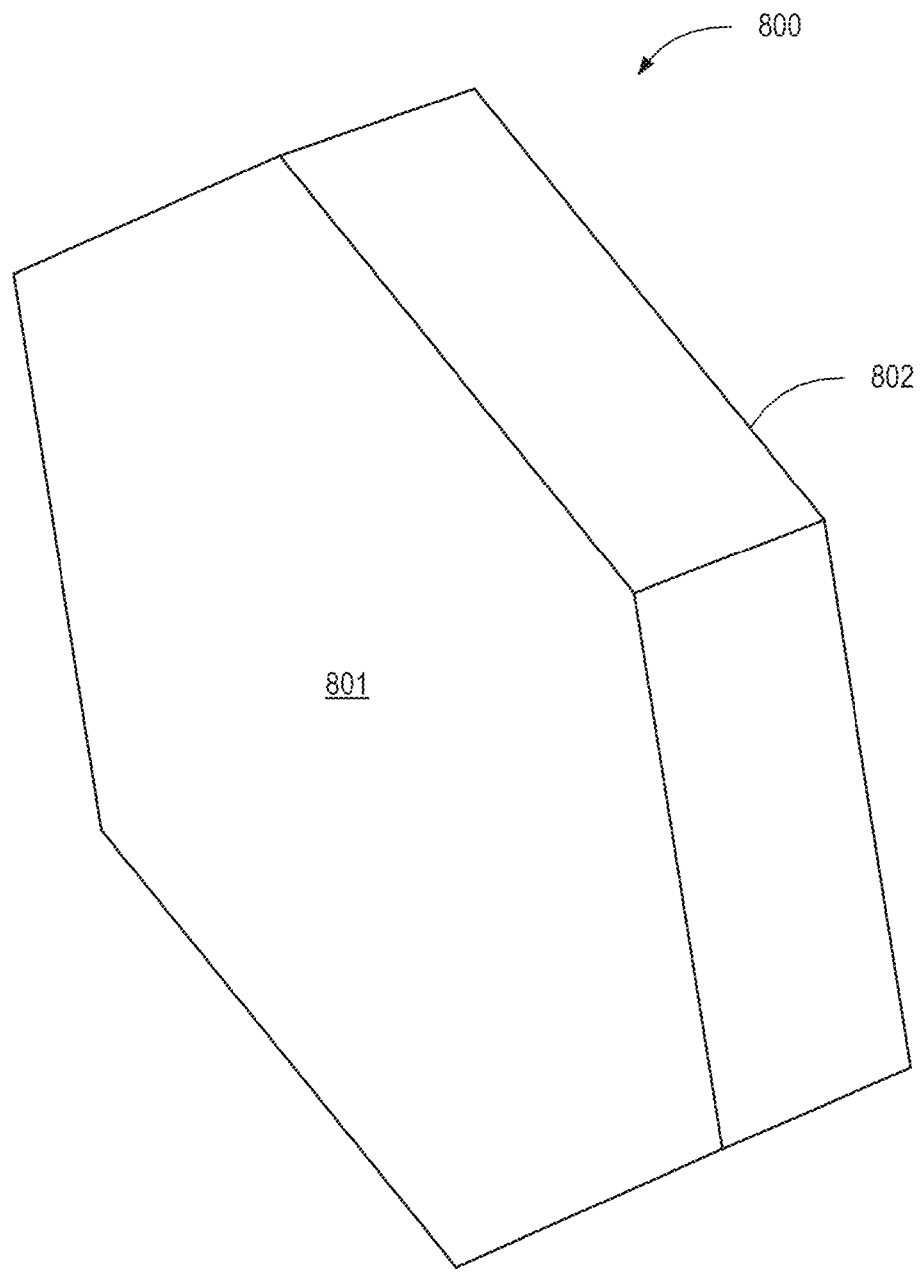
FIG. 8A illustrates an example of one embodiment of a double flattened hexagonal transmissive element for Fourier or inverse Fourier transformation.

FIG. 8A illustrates an example of one embodiment of a double flattened (opposing flat surfaces 801 and 802) hexagonal transmissive element 800 for Fourier- or inverse Fourier-transformation.

Figure 8B:
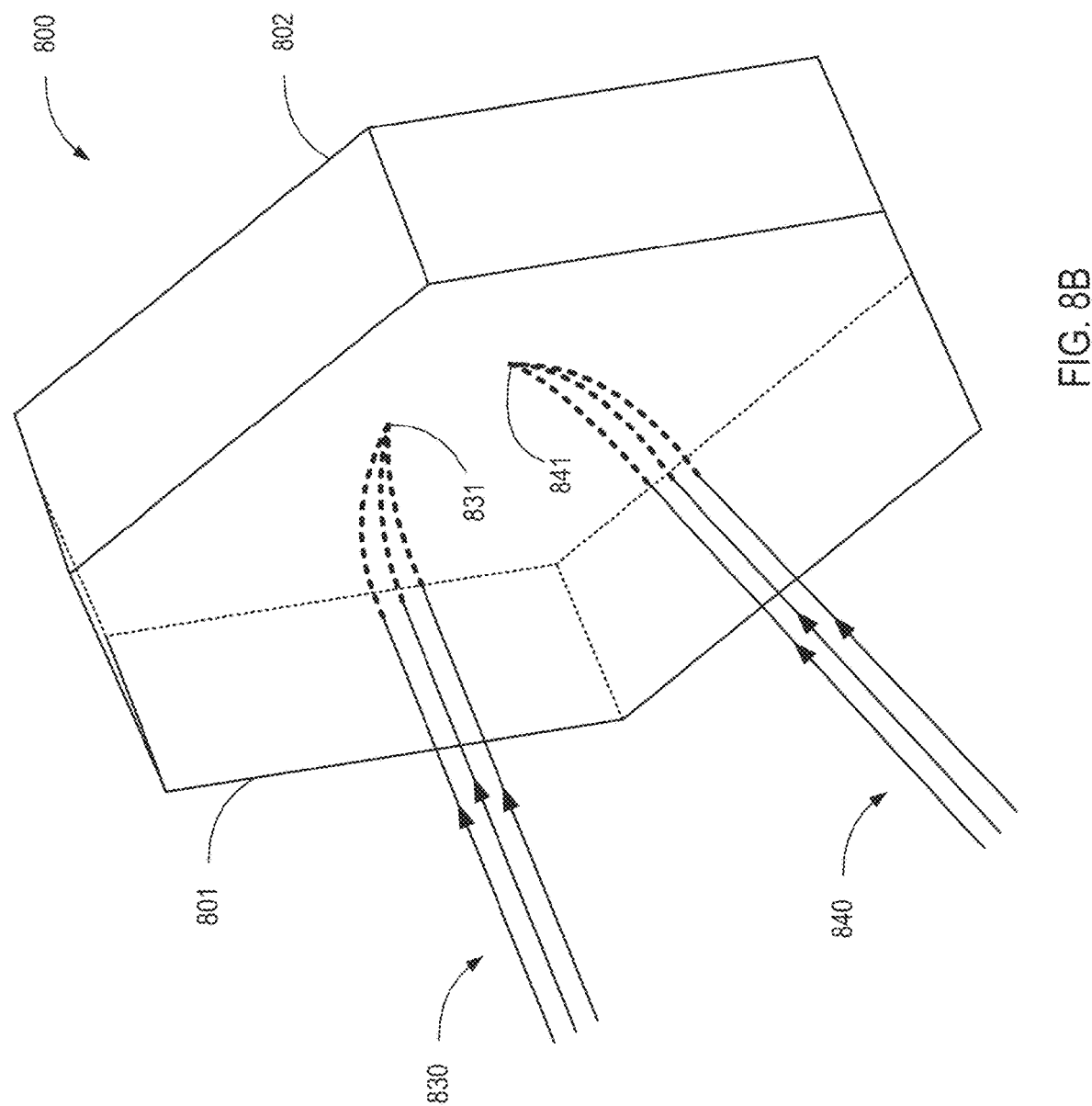
FIG. 8B illustrates incident optical radiation from two different angles being mapped to two different coordinate locations on an opposing surface, according to one embodiment.

FIG. 8B illustrates the double flattened hexagonal transmissive element 800 with optical radiation 830 and 840 incident on the planar surface 801 from two different angles being mapped to two different coordinate locations 831 and 841 respectively on the opposing surface 802, according to one embodiment.

Figure 8C:
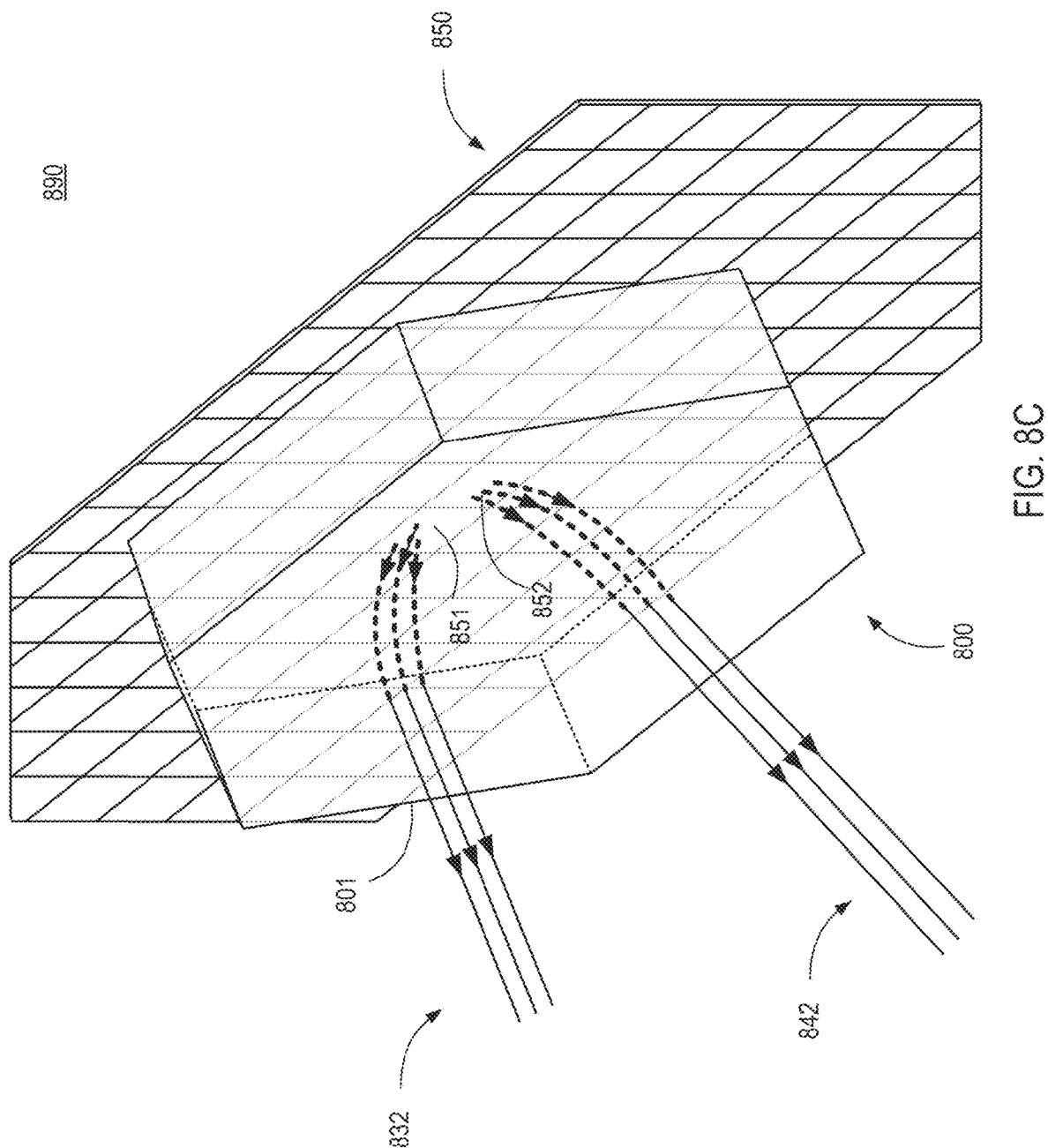
FIG. 8C illustrates optical radiation propagated in different directions (at different incident angles relative to the propagation surface) based on the sub-element origin of the optical radiation, according to one embodiment.

FIG. 8C illustrates an optical apparatus 890 with comprising a double flattened hexagonal transmissive element 800 and a modulation matrix 850 comprising an array of optically modulating sub-elements, including optically modulating sub-elements 851 and 852. Optically modulating sub-element 851 may be driven by a controller to generate optical radiation. The double flattened hexagonal transmissive element 800 inverse Fourier-transforms the optical radiation to map the optical radiation from the optically modulating sub-element 851 for propagation 832 at a first angle of incidence relative to the surface 801.

Optically modulating sub-element 852 may be driven by a controller to generate second optical radiation. The double flattened hexagonal transmissive element 800 inverse Fourier-transforms the second optical radiation to map the optical radiation from the optically modulating sub-element 852 for propagation 842 at a second angle of incidence relative to the surface 801.

Figure 8D:
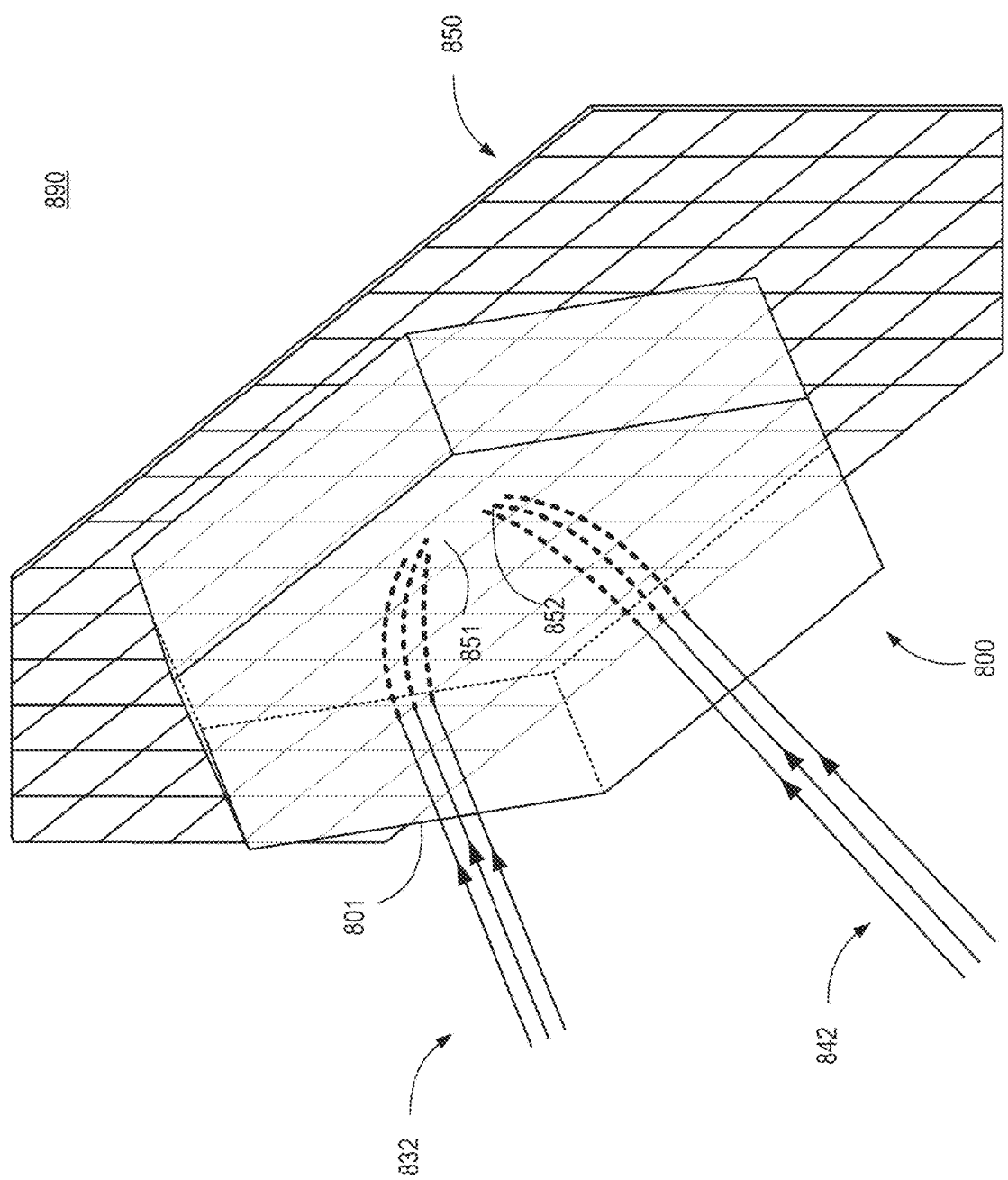
FIG. 8D illustrates the incident optical radiation from the two different angles being mapped to two different sub-elements of a modulation matrix with a focus at approximating the dimension of the sub-element, according to one embodiment.

FIG. 8D illustrates the same optical apparatus 890 with the double flattened hexagonal transmissive element 800 receiving optical radiation 832 and 842 at two different angles of incidence on surface 801. The double flattened hexagonal transmissive element 800 Fourier-transforms the optical radiation 832 and 842 to map the optical radiation 832 and 842 from each of the angles of incidence to corresponding coordinate locations associated with two different optically modulating sub-elements 851 and 852 of the modulating matrix 850.

FIG. 8E illustrates optical radiation 833 and 843 passing through the modulation matrix 850 and diverging as divergent optical radiation 834 and 844. The optical apparatus 890 with the double flattened hexagonal transmissive element 800 receives optical radiation 833 and 843 at two different angles of incidence on surface 801. The double flattened hexagonal transmissive element 800 Fourier-transforms the optical radiation 833 and 843 to map the optical radiation 833 and 843 from each of the angles of incidence to a corresponding coordinate location associated with two different optically modulating sub-elements 853 and 854 of the modulating matrix 850.

As illustrated, neither of the optically modulating sub-elements 853 and 854 is modifying the mapped optical radiation 833 and 843, so the optical radiation 833 and 843 passes through the optically modulating sub-elements 853 and 854 and diverges as divergent optical radiation 834 and 844.

Figure 8F:
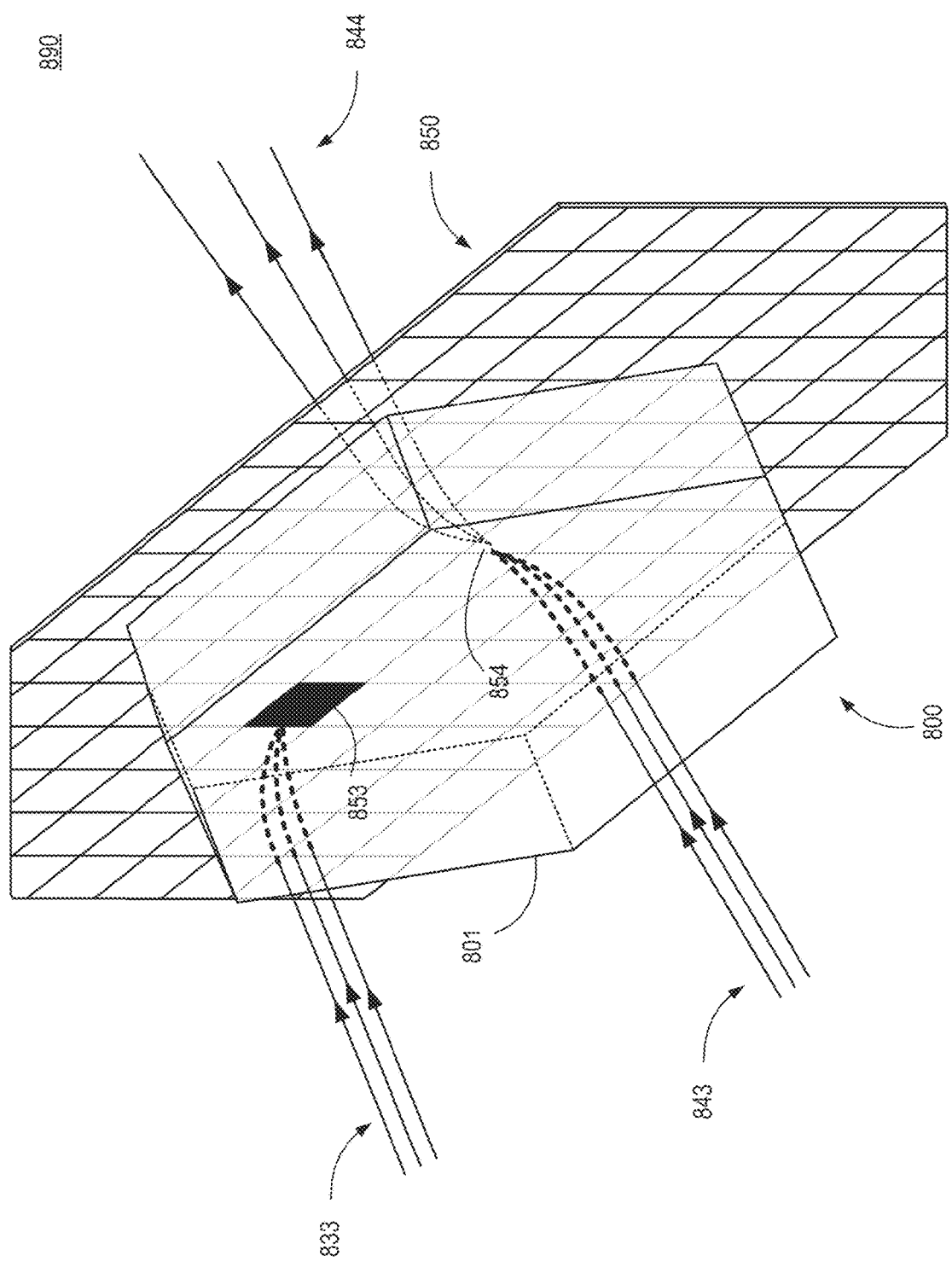
FIG. 8F illustrates the optical radiation from one angle passing through the modulation matrix, and the sub-element associated with another angle blocking the optical radiation, according to one embodiment.

FIG. 8F illustrates the optical apparatus 890 with optical radiation 843 from one angle passing through the optically modulating sub-element 854 of the modulation matrix 850 as divergent optical radiation 844. As illustrated, the optically modulating sub-element 853 is selectively configured to stop the transmission of optical radiation therethrough. Accordingly, optical radiation 833 at the other angle of incidence relative to the surface 801 is Fourier-transformed to map to the optically modulating sub-element 854. The optically modulating sub-element 854 prevents further transmission of the optical radiation 833.

Figure 8G:
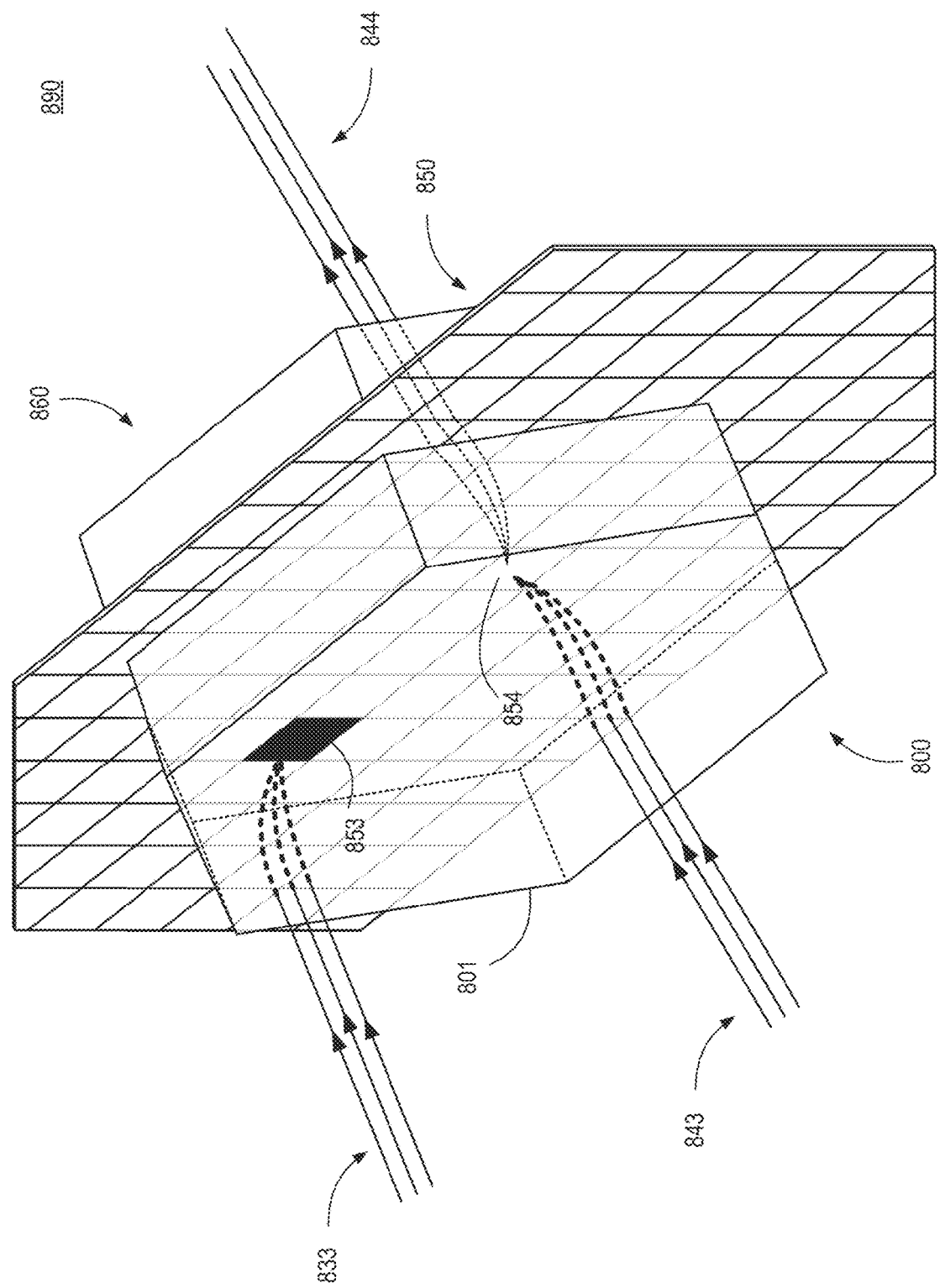
FIG. 8G illustrates the configuration of FIG. 8F with an inverse Fourier-transforming transmissive element for propagating the received optical radiation at the same angle, as modified by the modulation matrix, according to one embodiment.

FIG. 8G illustrates an optical apparatus 891 similar to that of FIG. 8F that further includes an inverse Fourier-transforming transmissive element 860 for propagating optical radiation 844 at an angle corresponding to that of the received optical radiation 843, as modified by the modulation matrix 850, according to one embodiment. As illustrated, the optically modulating sub-element 853 prevents optical radiation 833 from passing through for inverse Fourier-transformation by the inverse Fourier-transforming transmissive element 860 and propagation thereby.

Figure 9:
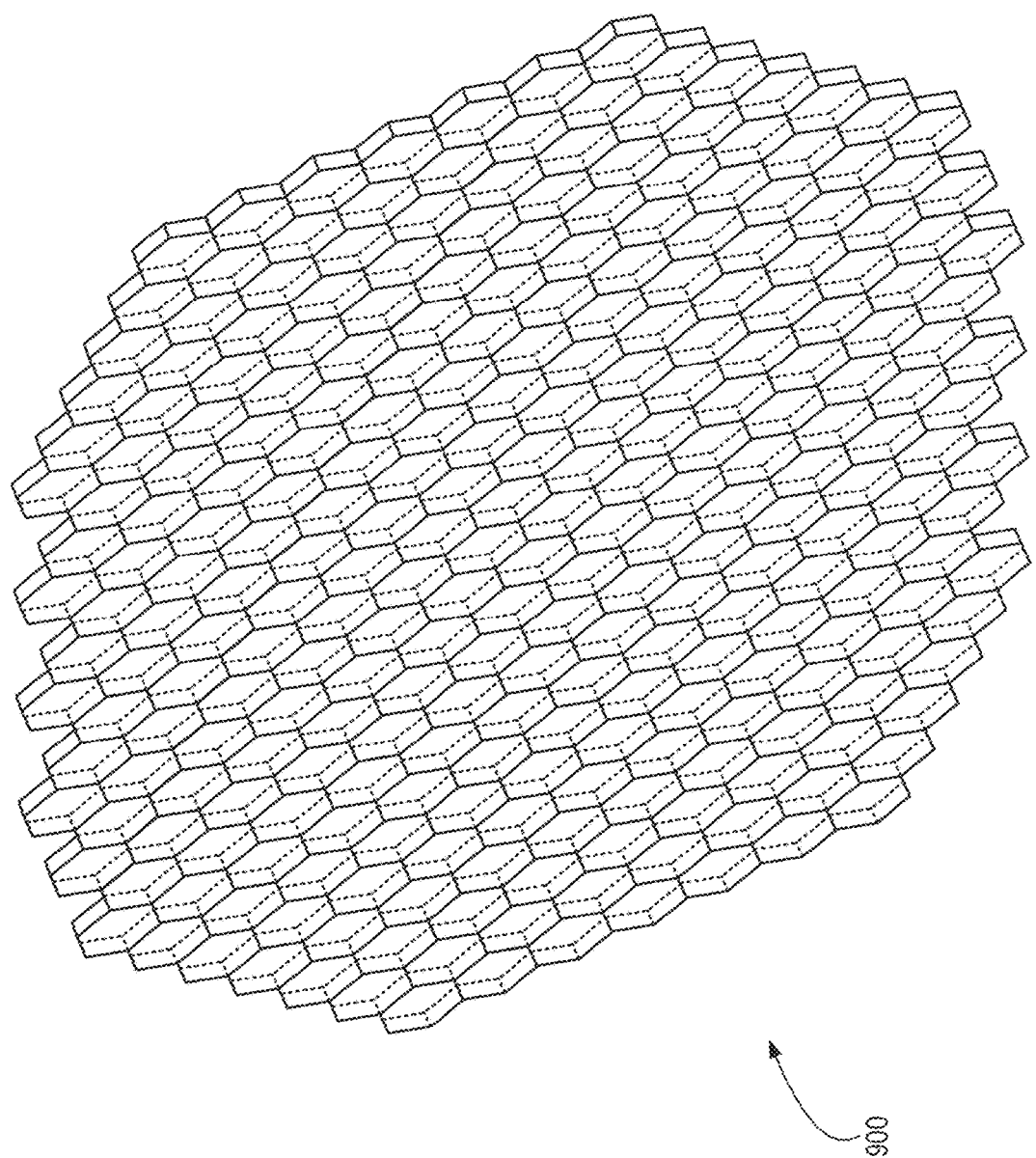
FIG. 9 illustrates an array of transmissive elements that may be configured to provide Fourier-transformation or inverse Fourier-transformation for mapping optical radiation between angles of incidence (including received optical radiation and propagated optical radiation) and coordinate locations, according to one embodiment.
Figure 10:
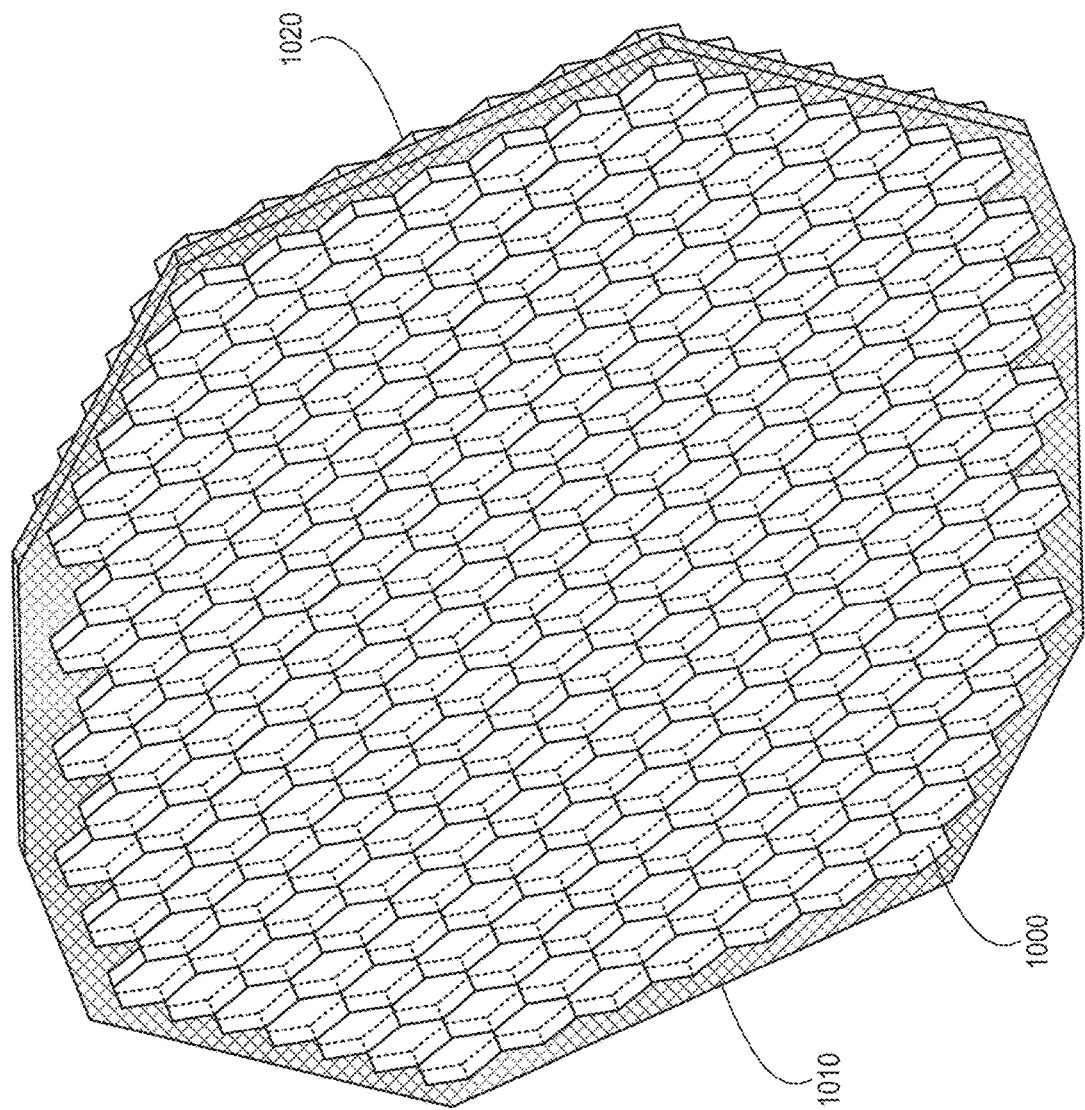
FIG. 10 illustrates a three-layer optical apparatus including an array of Fourier-transforming transmissive elements, a modulation matrix, and an array of inverse Fourier-transforming transmissive elements, according to one embodiment.

FIG. 9 illustrates an array 900 of double flattened transmissive elements, configured according to any of the embodiments described herein, including those hexagonal embodiments described in conjunction with FIGS. 8A-8G. Each of the double flattened transmissive elements is configured to perform a Fourier-transformation of optical radiation to map between incident angles and distinct coordinate locations on an opposing surface or proximate thereto. That is, each double flattened transmissive element may Fourier-transform optical radiation from a coordinate location on the opposing surface for propagation at an angle of incidence relative to the visible surface. Similarly, each double FIG. 10 illustrates a three-layer optical apparatus including an array 1000 of Fourier-transforming transmissive elements, a modulation matrix 1010 of optically modulating sub-elements, and an array 1020 of inverse Fourier-transforming transmissive elements, according to any of the various embodiments described herein. In the illustrated embodiment, each of the transmissive elements of the Fourier-transforming array 1000 and the inverse Fourier-transforming array 1020 embodiment may be double flattened or have a convex shape. Each of the transmissive elements may be hexagonal, as illustrated, to provide a near 100% fill factor. The modulation matrix 1010 of optically modulating sub-elements can be rectangular, circular, or another shape to provide an effective optical aperture for a specific application.

Figure 11A:
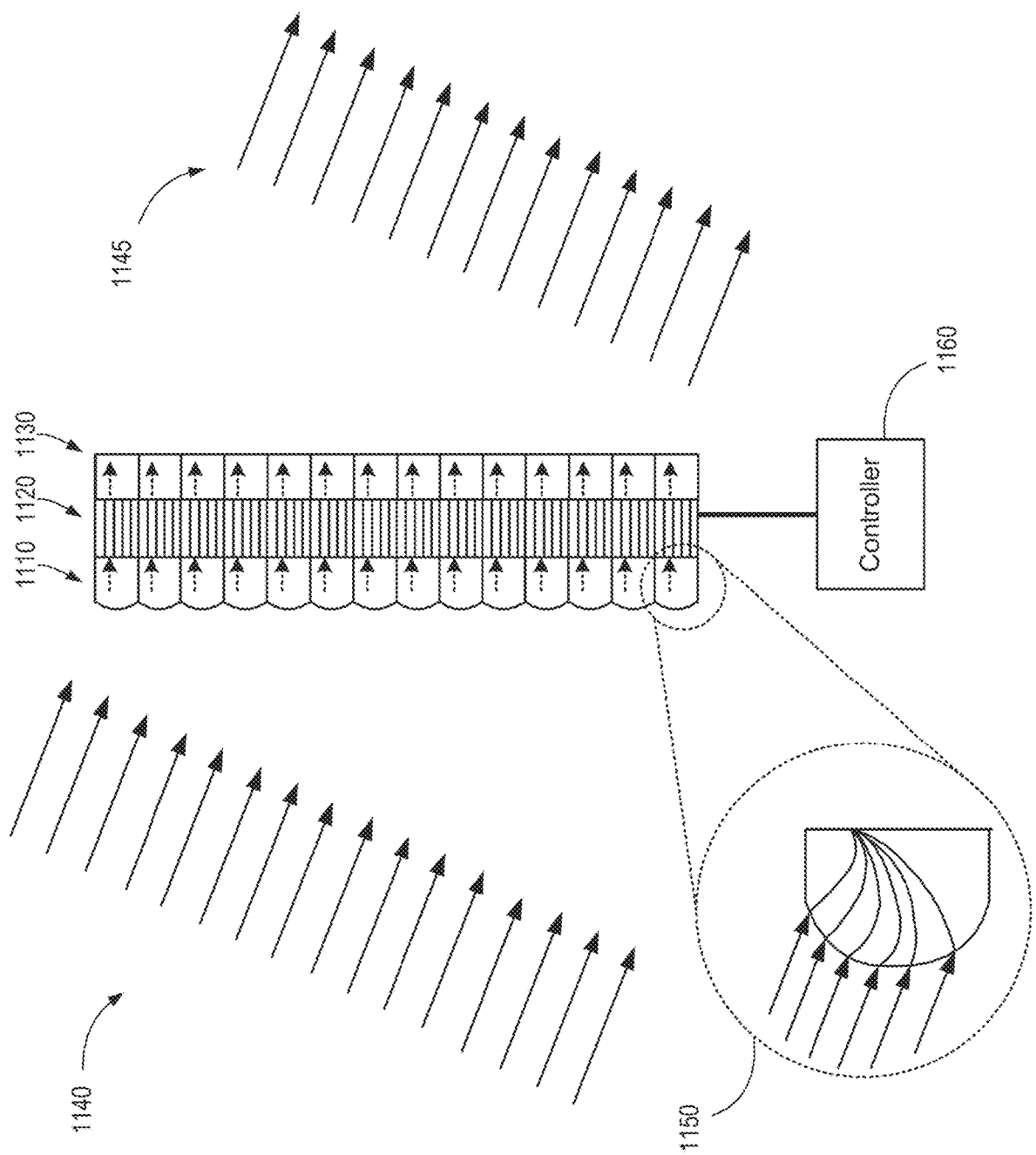
FIG. 11A illustrates a block diagram of a three-layer optical apparatus with a controller for controlling the sub-elements of a modulation matrix for direction-selective filtering, according to one embodiment.

FIG. 11A illustrates a block diagram of a three-layer optical apparatus comprising a Fourier-transforming layer 1110 of transmissive elements to map optical radiation 1140 from angles of incidence to coordinate locations on an opposing surface of each respective transmissive element. The Fourier-transformed optical radiation passes through one of a plurality of sub-elements of a modulation matrix layer 1120 based on the angle of incidence. A controller 1160 may selectively control individual or groups of sub-elements of the modulation matrix layer 1120 to selectively modify optical radiation originating from one or more angles of incidence relative to the Fourier-transforming layer 1110.

For example, the controller 1160 may selectively cause specific sub-elements of the modulation matrix layer 1120 corresponding to optical radiation received at one or more angles of incidence to modify the optical radiation from the specific angles. The modification of optical radiation may include amplifying, dimming, frequency shifting, or other modification as described herein. In some embodiments, the controller 1160 may drive some sub-elements of the modulation matrix layer 1120 to emit optical radiation to produce, for example, a heads-up display or an augmented reality.

The optical radiation 1140 incident on one of the transmissive elements is shown close-up, at 1150, with the optical radiation transformed from the angle of incidence to a coordinate location corresponding to one of the sub-elements of the modulation matrix layer 1120. The optical radiation, as direction-selectively modified by the modulation matrix layer 1120, is inverse Fourier-transformed from coordinate locations (e.g., specific sub-elements) for the propagation of optical radiation 1145 at angles of incidence on the output surface of the transmissive elements of the inverse Fourier-transforming layer 1130.

FIG. 11B illustrates the block diagram of the three-layer optical apparatus with the Fourier-transforming layer 1110 of transmissive elements to map optical radiation 1170 from angles of incidence to coordinate locations on an opposing surface of each respective transmissive element. The Fourier-transformed optical radiation passes through one of the sub-elements of the modulation matrix layer 1120 based on the angle of incidence. The controller 1160 selectively controls individual or groups of sub-elements of the modulation matrix layer 1120 to selectively modify optical radiation originating from one or more angles of incidence relative to the Fourier-transforming layer 1110.

The optical radiation, as direction-selectively modified by the modulation matrix layer 1120, is inverse Fourier-transformed from coordinate locations (e.g., specific sub-elements) for the propagation of optical radiation 1175 at angles of incidence on the output surface of the transmissive elements of the inverse Fourier-transforming layer 1130.

Comparing FIGS. 11A and 11B, the optical radiation 1140 at the first angle of incidence is mapped to the second sub-element of the modulation matrix 1120 of each respective transmissive element of the Fourier-transforming layer 1110. The optical radiation 1170 at the second angle of incidence is mapped to the bottom-most sub-element of the modulation matrix 1120 of each respective transmissive element of the Fourier-transforming layer 1110.

FIG. 12 illustrates a controller 1260 implementing direction-selective filtering by blocking optical radiation 1240 from one angle, according to one embodiment. As illustrated, the optical radiation 1240 from a first angle is Fourier-transformed based on the angle of incidence to a coordinate location of each transmissive element of a Fourier-transforming layer 1210 corresponding to one of a plurality of sub-elements of a matrix modulation layer 1220. In the illustrated embodiment, the controller 1260 implements direction-selective filtering by causing those sub-elements of the matrix modulation layer 1220 associated with mapped optical radiation from the optical radiation 1240 at the first angle to block the transmission of the optical radiation.

FIG. 13 illustrates a block diagram of a computing system 1300 for implementing one or more available direction-selective optical radiation modifications (filtering, dimming, shifting, augmenting, etc.) via a two-dimensional modulation matrix array 1310 of rectangular sub-elements that provide more horizontal angular selectivity than vertical angular selectivity, according to various embodiments. The computing system 1300 may include a processor 1330, memory 1340, and network communication module 1350 connected via a bus 1320. The computing system 1300 may selectively implement one or more control options 1370.

In some embodiments, the selectable control options 1370 may include only one option. For example, the two-dimensional modulation matrix array 1310 may allow for direction-selective blocking of optical radiation. In another embodiment, the two-dimensional modulation matrix array 1310 may allow for direction-selective augmentation of optical radiation passed from a Fourier-transforming layer to an inverse Fourier-transforming layer.

The optical apparatuses, systems, and methods described herein may be utilized in a wide variety of applications. Some applications and implementations may utilize a Fourier-transformation layer, a modulation matrix layer, and an inverse Fourier-transformation layer. In other embodiments, some applications and implementations may utilize only a modulation matrix layer with an inverse Fourier-transformation layer for propagating optical radiation generated by the modulation matrix layer at propagation angles based on the originating sub-element of the modulation matrix layer. Examples of two-layer embodiments include, for example, autostereoscopic displays. In other embodiments, an optical apparatus may include a modulation matrix layer for receiving optical radiation from a Fourier-transformation layer of transmissive elements. FIGS. 14A-17C illustrate various applications of two-layer and three-layer optical apparatuses operating according to various embodiments described herein and combinations thereof.

Figure 14A:
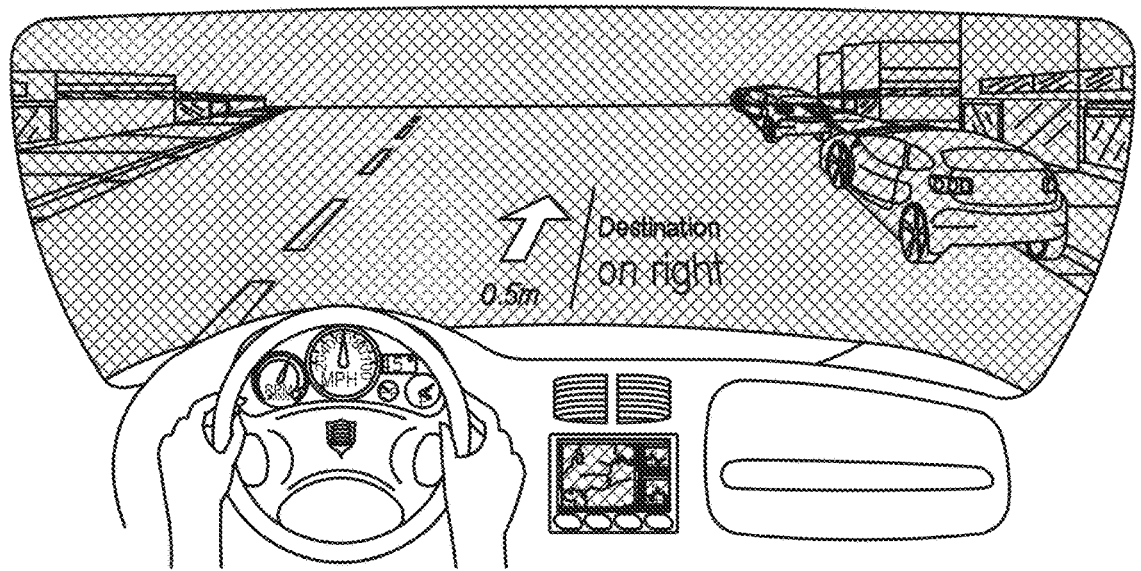
FIGS. 14A-C illustrate an optical apparatus according to one or more of the embodiments described herein used in a windshield of a car, boat, and helicopter, respectively.
Figure 14B:
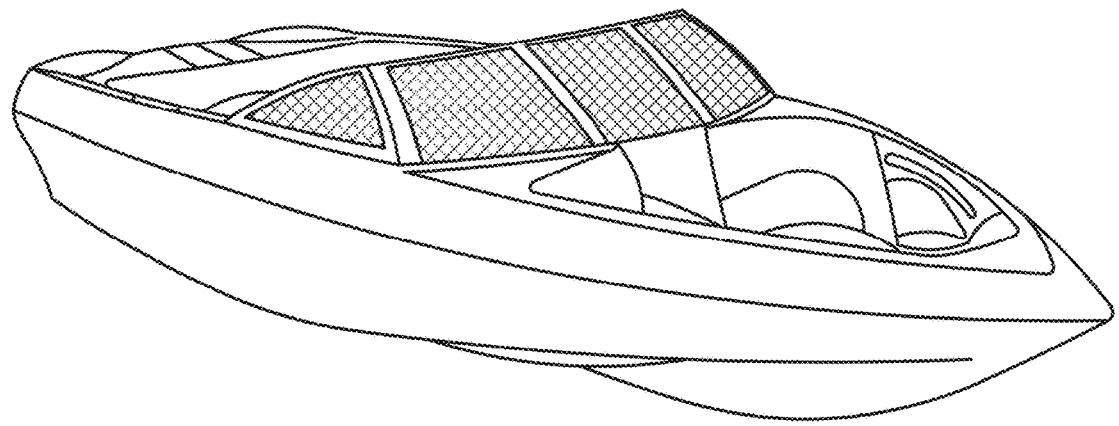
Figure 14C:
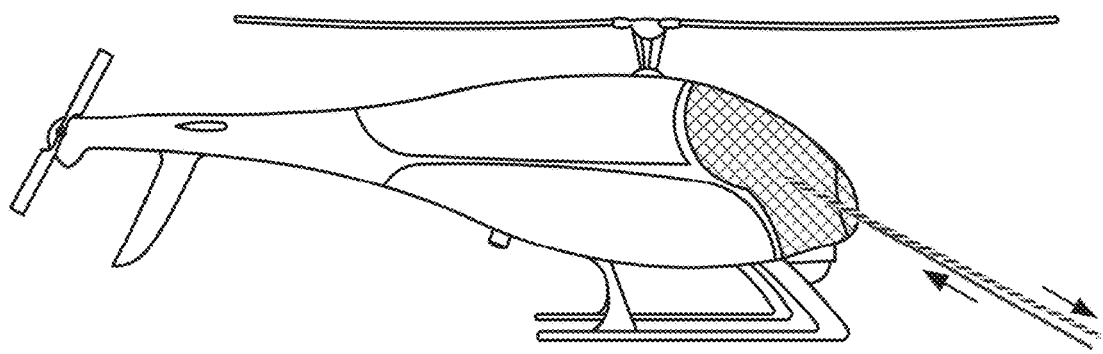

FIGS. 14A-C illustrate an optical apparatus according to one or more of the embodiments described herein used in a windshield of a car, boat, and helicopter, respectively. Specifically, FIG. 14A illustrates an optical apparatus integrated into a windshield with a modulation matrix configured to augment reality with a heads-up display. FIG. 14B illustrates a similar optical apparatus integrated into a boat. FIG. 14C illustrates an embodiment of an optical apparatus integrated into a helicopter as a defensive structure to protect occupants from optical attacks. In some embodiments, the defensive structure may selectively modify a transmittance of optically modulating sub-elements to retroreflect optical radiation from at least one target angle of incidence by selectively preventing the transmittance of optical radiation through the optically modulating sub-elements at the coordinate locations mapped to by each of the transmissive elements of the array at the at least one target angle of incidence.

In other embodiments, a defensive structure selectively modifies a transmittance of the optically modulating sub-elements to retroreflect optical radiation from at least one target angle of incidence by selectively reducing the transmittance of optical radiation through the optically modulating sub-elements at the coordinate locations mapped to by each of the transmissive elements of the array at the at least one target angle of incidence.

Figure 15A:
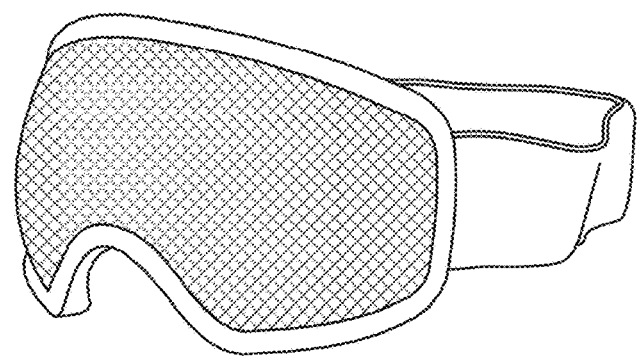
FIGS. 15A-C illustrate an optical apparatus according to one or more of the embodiments described herein used in goggles, a windshield, and a personal electronic device.
Figure 15B:
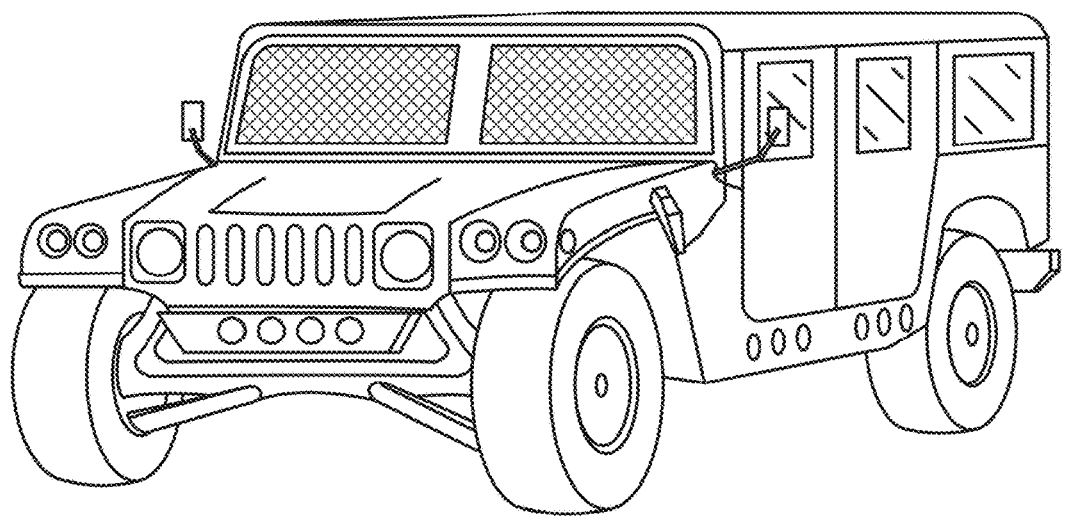
Figure 15C:
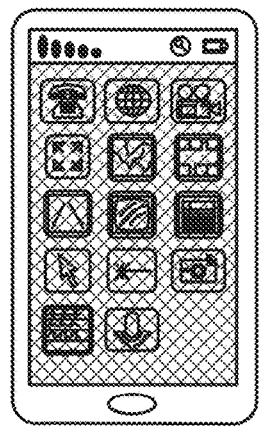

FIGS. 15A-C illustrate an optical apparatus according to one or more of the embodiments described herein used in goggles, a windshield, and a personal electronic device, respectively. In FIG. 15A, the goggles may include a three-layer optical apparatus to provide direction-selective filtering and modification of optical radiation transmitted through the goggles to a wearer.

The direction-selective filtering may, for example, operate to provide augmented reality, add a heads-up display, provide polarization filtering on a direction-selective basis, block or dim light from one or more directions, amplify light, increase contrast, color shift, or otherwise provide direction-based modifications. Any of the various direction-selective modifications may be implemented in a vehicle windshield, including defensive applications, as illustrated in FIG. 15B.

Displays may include two-layer optical apparatuses to provide, for example, autostereoscopic displays. Optical radiation from sub-elements of a modulation matrix mapped to one eye of the user may display a first image. Optical radiation from sub-elements of the modulation matrix mapped to the other eye of the user may display a second image. The first and second images can be selected to provide an autostereoscopic image or video. FIG. 15C illustrates an example of a mobile phone with an autostereoscopic display utilizing a modulation matrix and an inverse Fourier-transforming layer of transmissive elements.

Figure 16A:
FIG. 16A-C illustrate an optical apparatus according to one or more of the embodiments described herein used in a laptop screen, a contact lens, and a mirror.
Figure 16B:
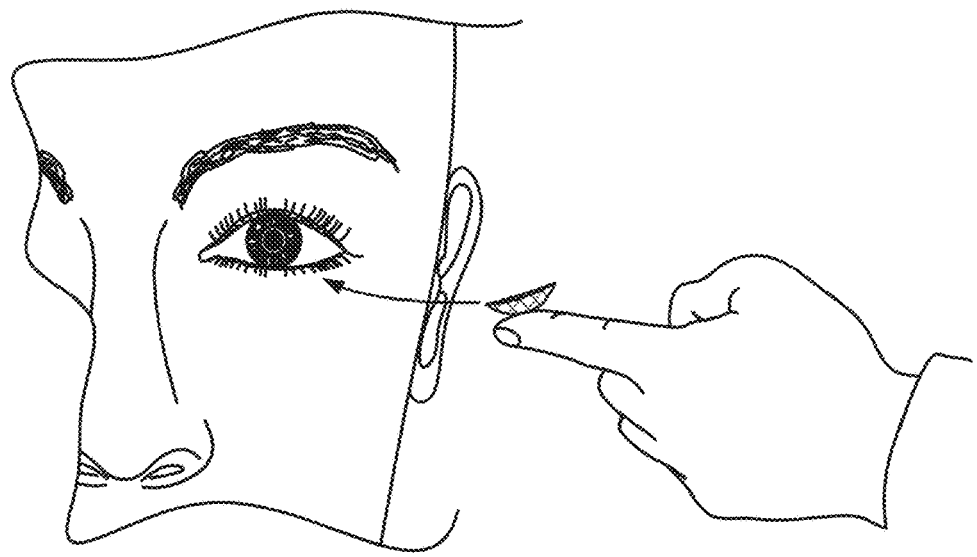
Figure 16C:
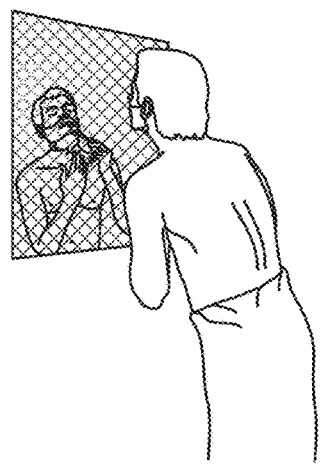

FIG. 16A-C illustrate an optical apparatus according to one or more of the embodiments described herein used in a laptop screen, a contact lens, and a mirror. In FIG. 16A, a laptop screen includes a two-layer display that operates as an autostereoscopic display with the modulation matrix transmitting optical radiation through an inverse Fourier-transforming layer of transmissive elements and operating to receive optical radiation (e.g., for image and video capture) via the transmissive elements operating to Fourier-transform received optical radiation, as described herein.

FIG. 16B illustrates an optical apparatus integrated into a corrective lens. More specifically into a contact lens. The optical apparatus may be a three-layer optical apparatus to correct, for example, myopia or hypermetropia of a wearer.

FIG. 16C illustrates a mirror with an integrated optical apparatus according to any of the embodiments described herein. For instance, a two-layer optical apparatus for transmitting optical radiation on a direction-selective basis may be integrated into a mirror. The two-layer optical apparatus may also operate to receive Fourier-transformed optical radiation for image capture by the optical apparatus.

Figure 17A:
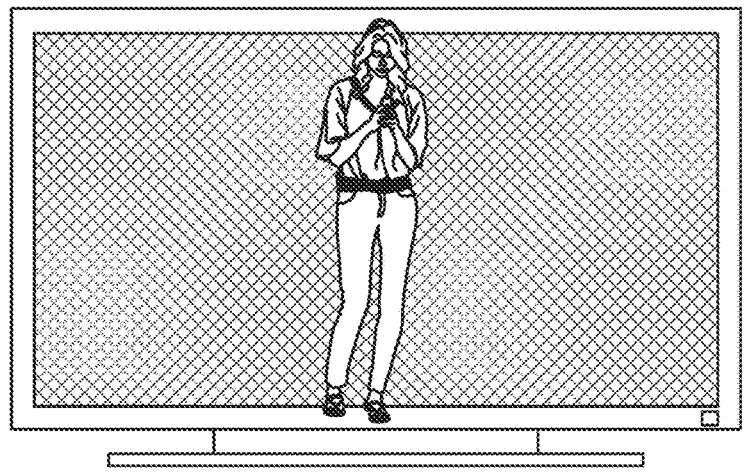
FIG. 17A-C illustrate an optical apparatus according to one or more of the embodiments described herein used in an autostereoscopic display, corrective eyeglasses, and an augmented reality headset.

FIG. 17A illustrates an optical apparatus operating as an autostereoscopic display, as described herein.

Figure 17B:
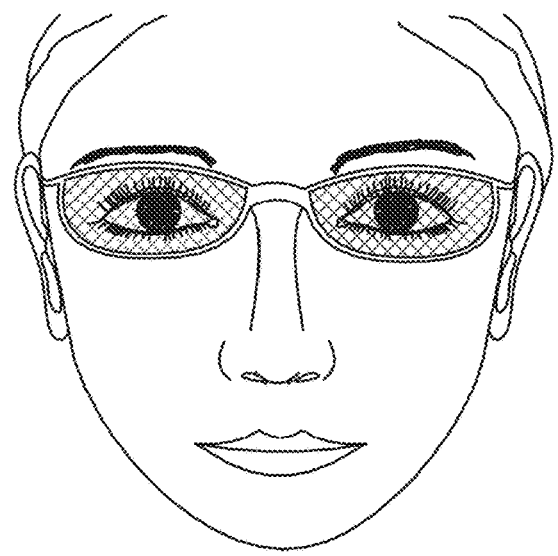

FIG. 17B illustrates an optical apparatus integrated into eyeglasses to provide, for example, direction-selective filtering and/or corrective focus adjustments via varifocal lens adjustments that may, in some embodiments, be user adjustable or automatically adjusted based on sensor measurements of eye location and focus determinations.

Figure 17C:
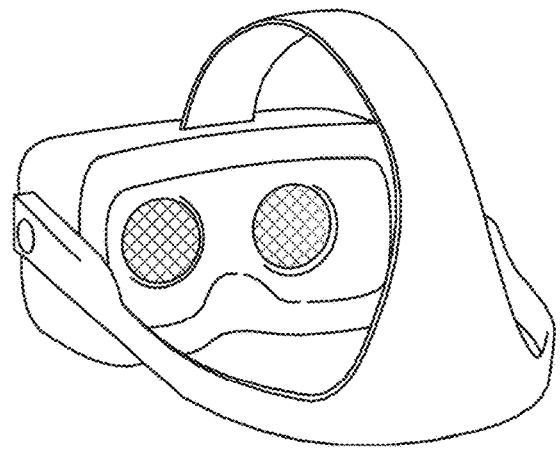

FIG. 17C illustrates a headset to provide augmented reality to a wearer, per the various embodiments described herein.

Many existing computing devices and infrastructures may be used in combination with the presently described systems and methods. Some of the infrastructure that can be used with embodiments disclosed herein is already available, such as general-purpose computers, computer programming tools and techniques, digital storage media, and communication links. A computing device or controller may include a processor, such as a microprocessor, a microcontroller, logic circuitry, or the like. A processor may include one or more special-purpose processing devices, such as application-specific integrated circuits (ASICs), programmable array logic (PAL), programmable logic array (PLA), programmable logic device (PLD), field-programmable gate array (FPGA), or other customizable and/or programmable device. The computing device may also include a machine-readable storage device, such as non-volatile memory, static RAM, dynamic RAM, ROM, CD-ROM, disk, tape, magnetic, optical, flash memory, or another machine-readable storage medium. Various aspects of certain embodiments may be implemented using hardware, software, firmware, or a combination thereof.

The components of the disclosed embodiments, as generally described and illustrated in the figures herein, could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail in order to avoid obscuring aspects of this disclosure.

The embodiments of the systems and methods provided within this disclosure are not intended to limit the scope of the disclosure but are merely representative of possible embodiments. In addition, the steps of a method do not necessarily need to be executed in any specific order, or even sequentially, nor do the steps need to be executed only once.

As described above, descriptions and variations described in terms of transmitters are equally applicable to receivers, vice versa, and as transceivers for continuous transceiving and/or time-gated or time modulated receiving/transmitting.

This disclosure has been made with reference to various embodiments, including the best mode. However, those skilled in the art will recognize that changes and modifications may be made to the various embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure.

These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. This disclosure should, therefore, be determined to encompass at least the claims submitted herewith, and combinations thereof.

What is claimed is:

1. A multi-layer refractive element with direction-selective filtering, comprising:
   a first optically transmissive layer to map optical radiation received at each of a plurality of angles of incidence to one of a plurality of locations on an output surface of the first layer;
   a modulation matrix of optically modulating sub-elements optically coupled to the output surface of the first layer;
   a second optically transmissive layer to inverse-map optical radiation transmitted through the modulation matrix of optically modulating sub-elements from each of the plurality of unique locations for propagation at angles corresponding to the received angles of incidence associated with each unique location; and
   at least one control input in communication with the modulation matrix of optically modulating sub-elements to selectively modify transmission of optical radiation from at least one of the unique locations on the output surface of the first optically transmissive layer to the second optically transmissive layer.

2. The multi-layer refractive element of claim 1, wherein the first optically transmissive layer operates to perform a Fourier transform of optical radiation from received angles of incidence to unique locations on a planar output surface.

3. The multi-layer refractive element of claim 1, wherein the first optically transmissive layer comprises a gradient refractive index lens.

4. The multi-layer refractive element of claim 1, wherein the first optically transmissive layer comprises a plurality of voxels with discrete dielectric constants approximating a continuous distribution of dielectric constants of a gradient refractive index lens, and wherein at least one of the plurality of voxels with discrete dielectric constants comprises a metamaterial with a target refractive index for an operational bandwidth.

5. The multi-layer refractive element of claim 1, further comprising an image inversion layer between the first optically transmissive layer and the second optically transmissive layer.

6. The multi-layer refractive element of claim 5, wherein the image inversion layer is positioned between the first optically transmissive layer and the modulation matrix of optically modulating sub-elements.

7. The multi-layer refractive element of claim 1, wherein the second optically transmissive layer comprises a varifocal lens responsive to a focus input control.

8. The multi-layer refractive element of claim 1, wherein the modulation matrix of optically modulating sub-elements comprises:
  an image sensor to capture an image of optical radiation transmitted through the optically modulating sub-elements; and
  at least one control input in communication with the modulation matrix of optically modulating sub-elements to selectively modify transmission of optical radiation from at least one of the unique locations on the surface of the first layer to the image sensor.

9. The multi-layer refractive element of claim 1, wherein at least some of the optically modulating sub-elements of the modulation matrix are controllable to selectively modify a reflectance of the optically modulating sub-elements.

10. The multi-layer refractive element of claim 1, wherein at least some of the optically modulating sub-elements of the modulation matrix are controllable to selectively modify optical extinction of the optically modulating sub-elements.

11. The multi-layer refractive element of claim 1, wherein at least some of the optically modulating sub-elements of the modulation matrix comprise a polarizing element to modify optical radiation transmitted therethrough.

12. The multi-layer refractive element of claim 1, wherein a first subset of optically modulating sub-elements of the modulation matrix operate to amplify optical radiation received at angles of incidence corresponding to a first spatial region, and wherein a second subset of optically modulating sub-elements of the modulation matrix operate to dim optical radiation received at angles of incidence corresponding to a second spatial region.

13. The multi-layer refractive element of claim 1, wherein a subset of the optically modulating sub-elements of the modulation matrix operates to generate an overlay on optical radiation from the transmissive elements of the array.

14. A multi-layer refractive apparatus with direction-selective filtering, comprising:
  an array of multi-layer direction-selective refractive elements, wherein each of the multi-layer direction-selective refractive elements comprises:
    a first optically transmissive layer to map optical radiation received at each of a plurality of angles of incidence to one of a plurality of locations on an output surface of the first layer;
    a modulation matrix of optically modulating sub-elements optically coupled to the output surface of the first layer;
    a second optically transmissive layer to inverse-map optical radiation transmitted through the modulation matrix of optically modulating sub-elements from each of the plurality of unique locations for propagation at angles corresponding to the received angles of incidence associated with each unique location; and
    at least one control input in communication with the modulation matrix of optically modulating sub-elements to selectively modify transmission of optical radiation from at least one of the unique locations on the output surface of the first layer to the second optically transmissive layer; and
  a controller in communication with each of the at least one control inputs of each of the multi-layer direction-selective refractive elements.

15. The multi-layer refractive apparatus of claim 14, wherein at least one of the optically modulating sub-elements of each of the multi-layer direction-selective refractive elements comprises a frequency converting sub-element, and wherein each of the at least one optically modulating sub-elements of each of the multi-layer direction-selective refractive elements comprises a frequency-converting phosphor.

16. The multi-layer refractive apparatus of claim 14, wherein each optically modulating sub-element of a subset of the optically modulating sub-elements of each of the multi-layer direction-selective refractive elements operates to modify optical radiation transmitted from the output surface of the first optically transmissive layer to the second optically transmissive layer to generate an overlay on the optical radiation.

17. The multi-layer refractive apparatus of claim 14, wherein the first optically transmissive layer is circular of each of the multi-layer direction-selective refractive elements, such that the multi-layer refractive apparatus comprises an array of circles.

18. The multi-layer refractive apparatus of claim 17, wherein gaps between elements within the array of circles are filled with porous silicon dioxide.

19. The multi-layer refractive apparatus of claim 17, wherein gaps between elements within the array of circles are filled with an immersion medium.

20. The multi-layer refractive apparatus of claim 14, wherein the first optically transmissive layer of each multi-layer refractive element comprises a first flattened Maxwell-Luneburg lens, where the output surface is flat,
  wherein the modulation matrix of optically modulating sub-elements of each multi-layer refractive element comprises a planar layer optically coupled to the flat output surface of the first flattened Maxwell-Luneburg lens with a corresponding shape and corresponding dimensions, and
  wherein the second optically transmissive layer of each multi-layer refractive element comprises a second flattened Maxwell-Luneburg lens with a flat surface optically coupled to the modulation matrix of optically modulating sub-elements.

21. The multi-layer refractive apparatus of claim 20, wherein at least one of the first and second flattened Maxwell-Luneburg lenses of each multi-layer refractive element is flattened on opposing surfaces such that each of the first and second flattened Maxwell-Luneburg lenses of each multi-layer refractive element comprises a disk-shaped lens.

22. The multi-layer refractive apparatus of 376, wherein each disk-shaped multi-layer refractive element comprises one of:
  a hexagonal disk with flat opposing surfaces,
  a circular disk with flat opposing surfaces, and
  a rectangular disk with flat opposing surfaces.

23. The multi-layer refractive apparatus of claim 14, wherein the first optically transmissive layer of each multi-layer refractive element comprises a lens with a simplified distribution of dielectric constants to map a plurality of narrow bands of optical radiation received at each of the plurality of angles of incidence to each respective unique location on the output surface of the first layer.

\* \* \* \* \*